(12) United States Patent
Yim et al.

(10) Patent No.: US 9,013,665 B2
(45) Date of Patent: Apr. 21, 2015

(54) DISPLAY DEVICE AND MANUFACTURING METHOD THEREOF

(71) Applicant: Samsung Display Co., Ltd., Yongin, Gyeonggi-Do (KR)

(72) Inventors: Tae Kyung Yim, Seoul (KR); Je Hyeong Park, Hwaseong-si (KR); O Sung Seo, Seoul (KR); Hyoung Cheol Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 153 days.

(21) Appl. No.: 13/890,417

(22) Filed: May 9, 2013

(65) Prior Publication Data

US 2014/0184971 A1 Jul. 3, 2014

(30) Foreign Application Priority Data

Dec. 31, 2012 (KR) ........................ 10-2012-0158591

(51) Int. Cl.
*G02F 1/1343* (2006.01)
*G02F 1/1368* (2006.01)

(52) U.S. Cl.
CPC .................... *G02F 1/1368* (2013.01)

(58) Field of Classification Search
CPC ................ G02F 1/134336; G02F 1/133707; G02F 1/1393; G02F 2001/134345; G02F 1/134363; G02F 1/134309
USPC .......................................... 349/143, 144, 146
See application file for complete search history.

(56) References Cited

U.S. PATENT DOCUMENTS

| 2012/0206688 | A1  | 8/2012 | Kim et al. |
| 2014/0002764 | A1* | 1/2014 | Seo et al. ........................ 349/43 |
| 2014/0055726 | A1* | 2/2014 | Cho et al. ...................... 349/106 |
| 2014/0098333 | A1* | 4/2014 | Kim et al. ..................... 349/106 |
| 2014/0125908 | A1* | 5/2014 | Hong et al. ..................... 349/44 |
| 2014/0160419 | A1* | 6/2014 | Lee et al. ...................... 349/154 |
| 2014/0176893 | A1* | 6/2014 | Sugitani et al. ............... 349/143 |

FOREIGN PATENT DOCUMENTS

KR 1020120026880 A 3/2012

OTHER PUBLICATIONS

Vivekanand Bhatt, Sudhir Chandra, Sushil Kumar, C M S Rauthan & P N Dixit, "Stress evaluation of RF sputtered silicon dioxide films for MEMS", Indian Journal of Pure & Applied Physics, vol. 45, Apr. 2007, pp. 377-381.
Kyung Chan Kim, Han Jin Ahn, Jong Bok Kim, Byoung Har Hwang, Hong Koo Baik and Se Jong Lee, "Inorganic Alignment Layers Using Noncontact Method for Liquid Crystal Displays", Japanese Journal of Applied Physics, vol. 44, No. 11, 2005, pp. 8071-8076.

* cited by examiner

*Primary Examiner* — Mike Qi
(74) *Attorney, Agent, or Firm* — Cantor Colburn LLP

(57) ABSTRACT

Provided are a display device and a manufacturing method thereof capable of preventing aggregation of an alignment layer and maintaining uniformly a cell-gap. The display device according to an exemplary embodiment of the invention includes: a substrate including a plurality of pixel areas; a thin film transistor formed on the substrate; a pixel electrode connected to the thin film transistor and formed in the pixel area; a barrier layer formed on the pixel electrode; a roof layer formed on the barrier layer to be spaced apart from the barrier layer with a microcavity therebetween; and a liquid crystal formed to fill the microcavity.

20 Claims, 41 Drawing Sheets

DISPLAY DEVICE AND MANUFACTURING METHOD THEREOF

This application claims priority to Korean Patent Application No. 10-2012-0158591 filed in on Dec. 31, 2012, and all the benefits accruing therefrom under 35 U.S.C. §119, the content of which in its entirety is herein incorporated by reference.

BACKGROUND (a) Field

Exemplary embodiments of the invention relates to a display device and a manufacturing method of the display device, and more particularly, to a display device, in which aggregation of an alignment layer is effectively prevented and a cell-gap, is substantially uniformly maintained, and a manufacturing method of the display device.

(b) Description of the Related Art

A liquid crystal display device, which is one of the most widely use types of flat panel display, typically includes two display panels with field generating electrodes, such as a pixel electrode, a common electrode and the like, and a liquid crystal layer interposed between the two display panels. The liquid crystal display device generates an electric field in the liquid crystal layer by applying a voltage to the field generating electrodes to control alignment of liquid crystal molecules of the liquid crystal layer through the generated electric field and control polarization of incident light, thereby displaying images.

Two display panels of the liquid crystal display device may include a thin film transistor array panel and an opposing panel. In the thin film transistor array panel, a gate line that transfers a gate signal and a data line that transfers a data signal are provided to cross each other, and thin film transistor connected with the gate line and the data line, and a pixel electrode connected with the thin film transistor may be provided. In the opposing panel, a light blocking member, a color filter, a common electrode, and the like may be provided. Alternatively, the light blocking member, the color filter and the common electrode may be provided on the thin film transistor array panel.

However, in a conventional liquid crystal display device, two substrates are typically used and respective constituent elements are provided on the two substrates.

SUMMARY

Exemplary embodiments of the invention relate to a display device with light weight and reduced thickness, and a manufacturing method of the display device with reduced cost and processing time by manufacturing the display device using a single substrate. In such embodiments, aggregation of an alignment layer is effectively prevented and a cell-gap is substantially uniformly maintained.

An exemplary embodiment of the invention provides display device, including: a substrate including a plurality of pixel areas; a thin film transistor disposed on the substrate; a pixel electrode connected to the thin film transistor and disposed in a corresponding pixel area of the pixel areas; a barrier layer disposed on the pixel electrode; a roof layer disposed on the barrier layer and spaced apart from the barrier layer, where a microcavity is defined between the roof layer and the barrier layer; and a liquid crystal disposed in the microcavity.

In an exemplary embodiment, the barrier layer may include silicon oxide.

In an exemplary embodiment, the barrier layer may function as a lower alignment layer.

In an exemplary embodiment, the display device may further include an upper alignment layer disposed below the roof layer and spaced apart from the barrier layer, where the microcavity may be defined between the upper alignment layer and the barrier layer, and the upper alignment layer may include silicon oxide.

In an exemplary embodiment, the display device may further include a lower insulating layer disposed between the upper alignment layer and the roof layer; and an upper insulating layer disposed on the roof layer, where each of the lower insulating layer and the upper insulating layer may include silicon oxide.

In an exemplary embodiment, the display device may further include a lower insulating layer disposed between the upper alignment layer and the roof layer; and an upper insulating layer disposed on the roof layer, where the lower insulating layer may include silicon oxide, and the upper insulating layer may include silicon nitride.

In an exemplary embodiment, the barrier layer may be disposed only in the pixel areas, or disposed on an entire of a surface of the substrate including the pixel areas.

In an exemplary embodiment, the display device may further include a lower alignment layer disposed on the barrier layer; and an upper alignment layer disposed below the roof layer and spaced apart from the lower alignment layer, where the microcavity may be defined between the upper alignment layer and the lower alignment layer.

In an exemplary embodiment, each of the lower alignment layer and the upper alignment layer may include an organic material.

In an exemplary embodiment, the display device may further include a lower insulating layer disposed between the upper alignment layer and the roof layer; and an upper insulating layer disposed on the roof layer, where each of the lower insulating layer and the upper insulating layer may include silicon oxide.

Another exemplary embodiment of the invention provides a manufacturing method of a display device, including: providing a thin film transistor on a substrate including a pixel area; providing a pixel electrode connected to the thin film transistor in the pixel area; providing a barrier layer on the pixel electrode; providing a sacrificial layer on the barrier layer; providing a roof layer on the sacrificial layer; forming an opening in the roof layer, that the opening exposes a portion of the sacrificial layer; providing a microcavity between the pixel electrode and the roof layer by removing the sacrificial layer; injecting a liquid crystal through the opening; and providing an overcoat layer on the roof layer, where the overcoat layer seals the microcavity.

In an exemplary embodiment, the providing the barrier layer may include depositing silicon oxide on the substrate, on which the thin film transistor and the pixel electrode are provided.

In an exemplary embodiment, the barrier layer may function as a lower alignment layer.

In an exemplary embodiment, the manufacturing method of a display device may further include providing an upper alignment layer on the sacrificial layer by depositing silicon oxide, after the providing the sacrificial layer.

In an exemplary embodiment, the manufacturing method of a display device may further include providing a lower insulating layer on the upper alignment layer by depositing silicon oxide after the providing the upper alignment layer, and providing an upper insulating layer on the roof layer by depositing silicon oxide after the providing the roof layer.

In an exemplary embodiment, the manufacturing method of a display device may further include providing a lower insulating layer on the upper alignment layer by depositing silicon oxide after the providing the upper alignment layer, and providing an upper insulating layer on the roof layer by depositing silicon nitride after the providing the roof layer.

In an exemplary embodiment, the depositing the silicon oxide may include depositing the silicon oxide on substantially an entire of a surface of the substrate, or depositing the silicon oxide on substantially the entire of the surface of the substrate, and patterning the deposited silicon oxide such that the barrier layer is provided only in the pixel area.

In an exemplary embodiment, the manufacturing method of a display device may further include providing a lower alignment layer on the barrier layer by injecting an aligning agent in the microcavity and providing an upper alignment layer below the roof layer after the providing the microcavity, where the upper alignment layer may be spaced apart from the lower alignment layer, and the microcavity may be defined between the upper alignment layer and the lower alignment layer.

In an exemplary embodiment, the aligning agent may include an organic material.

In an exemplary embodiment, the manufacturing method of a display device may further include providing a lower insulating layer on the sacrificial layer by depositing silicon oxide after the providing the sacrificial layer, and the providing an upper insulating layer on the roof layer by depositing silicon oxide after the providing the roof layer.

In exemplary embodiments of the display device and the manufacturing method of the display device, aggregation of an alignment layer is effectively prevented by depositing and providing the alignment layer. In such embodiments, a roof layer is effectively prevented from being lifted around an opening for injecting a liquid crystal by a low-temperature deposition and a low-stress deposition, by providing an upper insulating layer and a lower insulating layer, which are positioned above and below the roof layer, respectively, using silicon oxide, and a cell-gap is substantially uniformly provided.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION OF THE EMBODIMENTS

Figure 1:
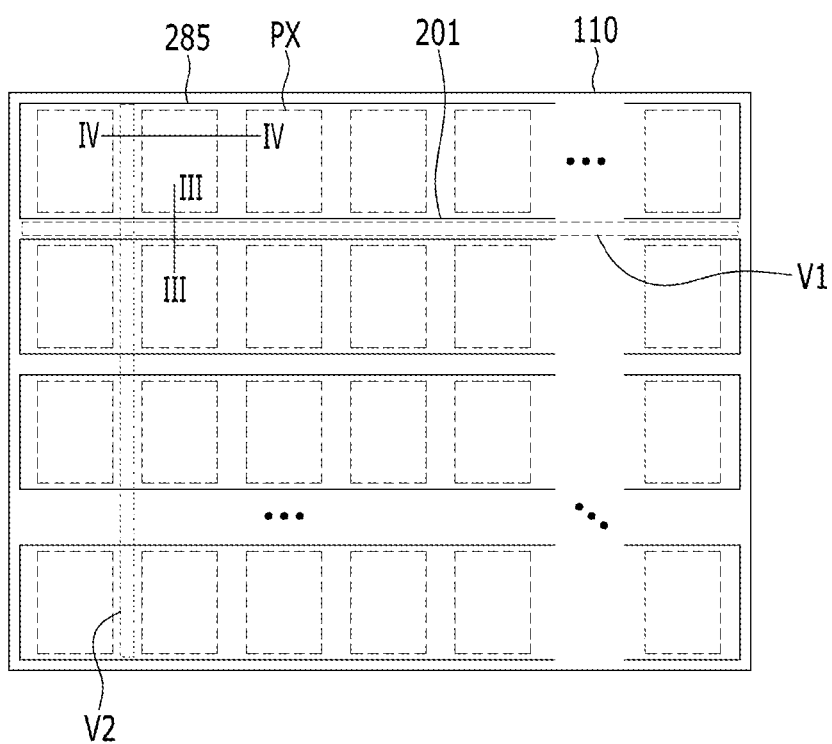
FIG. 1 is a plan view of an exemplary embodiment of a display device according the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice.

Hereinafter, exemplary embodiments of a liquid crystal display according to the invention will be described in detail with reference to the accompanying drawings.

First, an exemplary embodiment of a display device according to the invention will hereinafter be described with reference to FIGS. 1 to 4.

Figure 2:
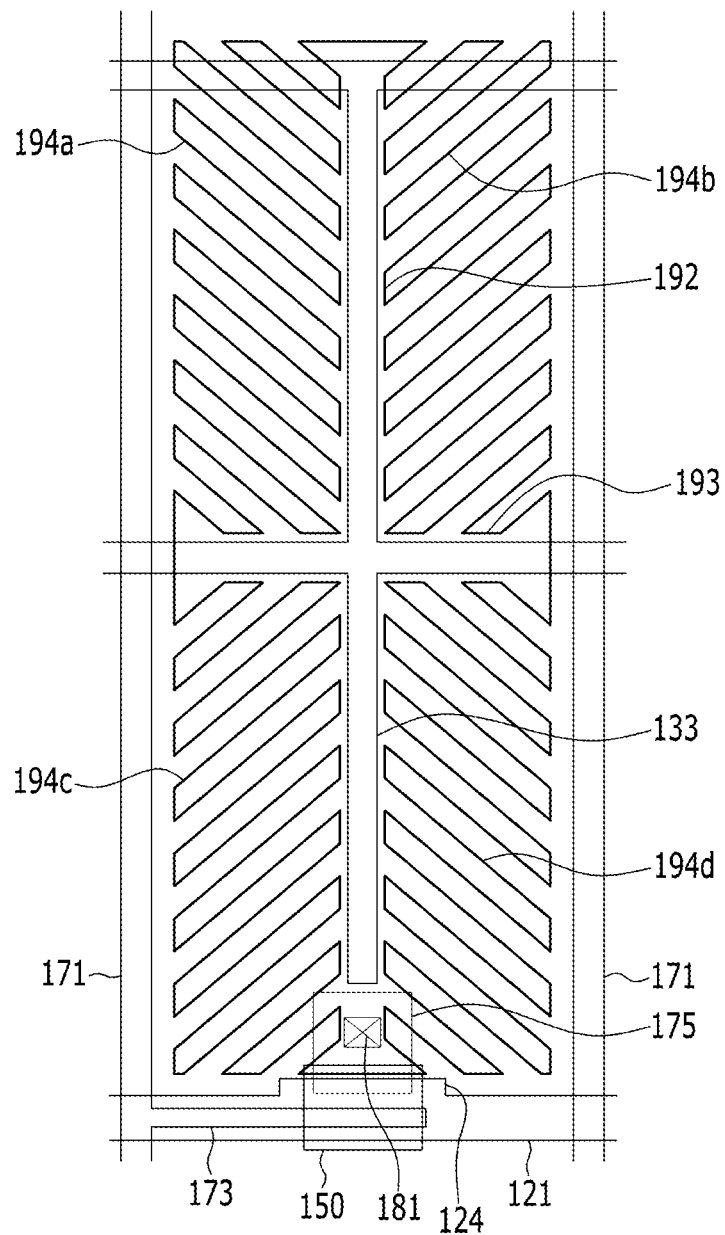
FIG. 2 is a plan view illustrating an exemplary embodiment of a pixel of the display device according to the invention.
Figure 3:
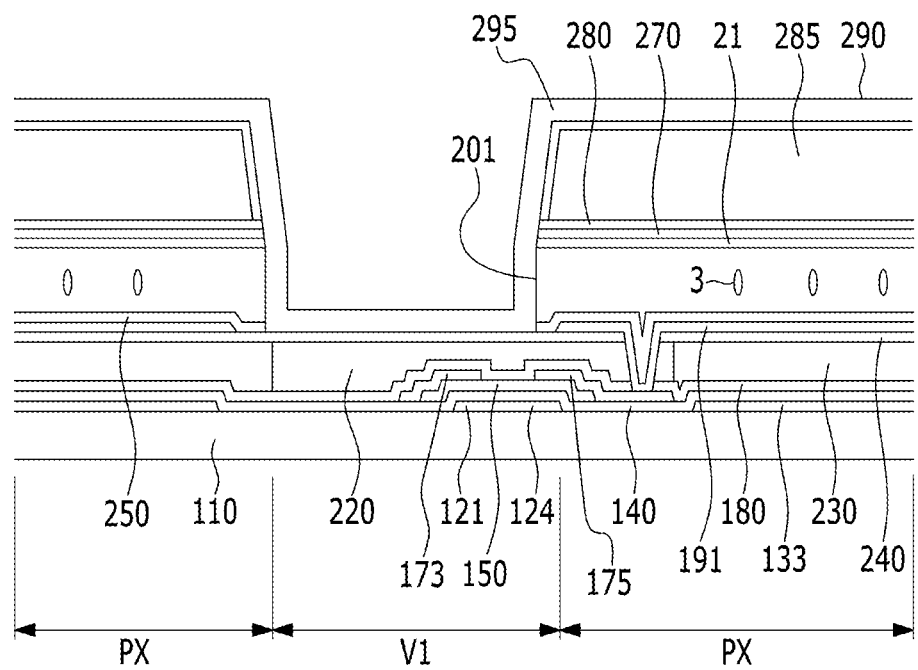
FIG. 3 is a cross-sectional view taken along line III-III of the display device of FIG. 1.
Figure 4:
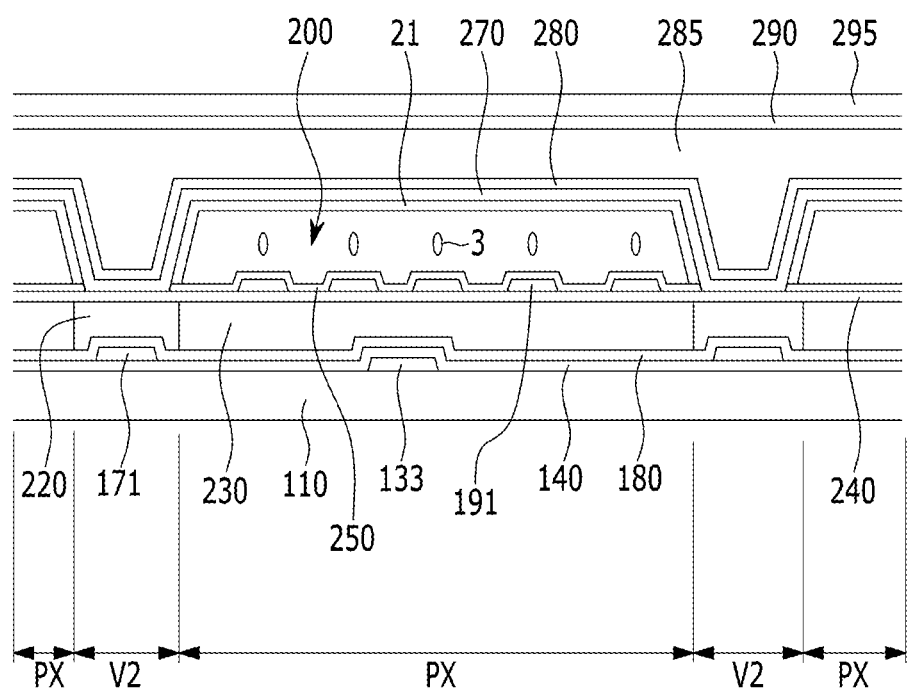
FIG. 4 is a cross-sectional view taken along line IV-IV of the display device of FIG. 1.

FIG. 1 is a plan view of an exemplary embodiment of a display device according to the invention, and FIG. 2 is a plan view of an exemplary embodiment of a pixel of the display device according to the invention. FIG. 3 is a cross-sectional view taken along line III-III of the display device of FIG. 1, and FIG. 4 is a cross-sectional view taken along line IV-IV of the display device of FIG. 1.

Referring to FIGS. 1 to 4, an exemplary embodiment of a display device includes a substrate 110 including a material, such as glass or plastic, for example.

The substrate 110 includes a plurality of pixel areas PX, defined thereon. The plurality of pixel areas PX is disposed substantially in a matrix form, which includes a plurality of pixel rows and a plurality of pixel columns. A first valley V1 is positioned between the pixel rows, and a second valley V2 is positioned between the pixel columns.

However, an arrangement of the plurality of pixel areas PX is not limited thereto and may be variously modified.

In an exemplary embodiment, a gate line 121 are disposed in a first direction (e.g., a pixel row direction), and a data line 171 are disposed in a second direction (e.g., a pixel column direction) on the substrate 110. Herein, the first direction and the second direction may be substantially perpendicular to each other. The gate line 121 is disposed along the first valley V1, and the data line 171 is disposed along the second valley V2. In an exemplary embodiment, the gate line 121 and the data line 171 may cross each other. In an exemplary embodiment, a pixel area PX of the substrate 110 may be defined by the gate line 121 and the data line 171, which cross each other.

The gate line 121 extends substantially in the first direction and transfers a gate signal. The gate line 121 may include a gate electrode 124 protruding therefrom. The gate signal is applied to the gate electrode 124 through the gate line 121.

In an exemplary embodiment, a storage electrode 133 may be disposed in the pixel area PX and spaced apart from the gate line 121 and the gate electrode 124. In an exemplary embodiment, as shown in FIG. 2, the storage electrode 133 may be substantially parallel to the gate line 121 and the data line 171. In an alternative exemplary embodiment, the storage electrode 133 may be substantially parallel only to the gate line 121. A storage electrode 133 in the pixel area PX may be connected to an adjacent storage electrode 133 disposed in an adjacent pixel area PXs. A constant voltage, e.g., a common voltage, is applied to the storage electrode 133.

In an exemplary embodiment, as shown in FIGS. 3 and 4, a gate insulating layer 140 is disposed on the gate line 121, the gate electrode 124 and the storage electrode 133. The gate insulating layer 140 may include an inorganic insulating material, such as silicon nitride (SiNx) and silicon oxide (SiOx), for example. In an exemplary embodiment, the gate insulating layer 140 may a single layer structure or a multiple layer structure.

In an exemplary embodiment, a semiconductor layer 150 is disposed on the gate insulating layer 140. The semiconductor layer 150 may be disposed corresponding to the gate electrode 124. In an exemplary embodiment, the semiconductor layer 150 may overlap the gate electrode 124. In an exemplary embodiment, as shown in FIG. 2, the semiconductor layer 150 may extend in the second direction. The semiconductor layer 150 may include amorphous silicon, polycrystalline silicon, metal oxide or the like, for example.

In an exemplary embodiment, a source electrode 173 protruding from the data line 171 and a drain electrode 175 spaced apart from the source electrode 173 are provided on the semiconductor layer 150.

The data line 171 extends substantially in the second and transfers the data signal. The data signal transferred to the data line 171 is applied to the source electrode 173.

The gate electrode 124, the semiconductor layer 150, the source electrode 173 and the drain electrode 175 collectively define a thin film transistor. When the thin film transistor is turned on, the data signal applied to the source electrode 173 is transferred to the drain electrode 175.

In an exemplary embodiment, a passivation layer 180 is disposed on the data line 171, the source electrode 173, the drain electrode 175 and the semiconductor layer 150, which is exposed between the source and drain electrodes 173 and 175. The passivation layer 180 may include an organic insulating material or an inorganic insulating material, and may have a single layer structure or a multiple layer structure.

In an exemplary embodiment, a color filter 230 is disposed in the pixel area PX on the passivation layer 180. The color filter 230 may display one of primary colors, e.g., three primary colors of red, green and blue, but not being limited thereto. In an alternative exemplary embodiment, the color filter 230 may display one of cyan, magenta, yellow and white-based colors.

In an exemplary embodiment, a light blocking member 220 is disposed in a region between the adjacent color filters 230. The light blocking member 220 is disposed at a boundary of the pixel area PX and the thin film transistor such that light leakage is effectively prevented. In an exemplary embodiment, the light blocking member 220 may be disposed along the first valley V1 and the second valley V2.

In an exemplary embodiment, a first insulating layer 240 may be disposed on the color filter 230 and the light blocking member 220. The first insulating layer 240 may include an inorganic insulating material such as silicon nitride (SiNx)

and silicon oxide (SiOx), for example. The first insulating layer 240 protects the color filter 230 or the light blocking member 220, which includes the organic materials. In an alternative exemplary embodiment, the first insulating layer 240 may be omitted.

In an exemplary embodiment, a contact hole 181 is defined, e.g., formed, in the first insulating layer 240, the light blocking member 220 and the passivation layer 180, and the contact hole 181 exposes a portion of the drain electrode 175. In an alternative exemplary embodiment, the contact hole 181 may be defined in the first insulating layer 240, the color filter 230 and the passivation layer 180.

In an exemplary embodiment, a pixel electrode 191, which is connected to the drain electrode 175 through the contact hole 181, is disposed on the first insulating layer 240. The pixel electrode 191 is disposed in the pixel area PX and connected to the drain electrode 175, and receives the data signal from the drain electrode 175 when the thin film transistor is turned on. The pixel electrode 191 may include a transparent conductive material, such as indium tin oxide ("ITO") and indium zinc oxide ("IZO"), for example.

The pixel electrode 191 includes a horizontal stem 193, a vertical stem 192, which is substantially perpendicular to the horizontal stem 193, and a plurality of first to fourth minute branch portions 194a, 194b, 194c and 194d.

The horizontal stem 193 may extend in a direction substantially parallel to the gate line 121 (e.g., the first direction), and the vertical stem 192 may extend in a direction substantially parallel to the data line 171 (e.g., the second direction). The horizontal stem 193 may be disposed substantially halfway between two adjacent gate lines 121, and the vertical stem 192 may be disposed substantially halfway between two adjacent data lines 171.

In an exemplary embodiment, a pixel area PX may be divided into a first subpixel area, a second subpixel area, a third subpixel area and a fourth subpixel area, which are defined by the horizontal stem 193 and the vertical stem 192. The first subpixel area is positioned at a left side of the vertical stem 192 and an upper side of the horizontal stem 193, and the second subpixel area is positioned at a right side of vertical stem 192 and the upper side of the horizontal stem 193. The third subpixel area is positioned at the left side of the vertical stem 192 and a lower side of the horizontal stem 193, and the fourth subpixel area is positioned at the right side of the vertical stem 192 and the lower side of the horizontal stem 193.

The first minute branch portion 194a is disposed in the first subpixel area, and the second minute branch portion 194b is disposed in the second subpixel area. The third minute branch portion 194c is disposed in the third subpixel area, and the fourth minute branch portion 194d is disposed in the fourth subpixel area.

The first minute branch portion 194a obliquely extends substantially in an upper left direction from the horizontal stem 193 or the vertical stem 192, and the second minute branch portion 194b obliquely extends substantially in an upper right direction from the horizontal stem 193 or the vertical stem 192. The third minute branch portion 194c obliquely extends substantially in a lower left direction from the horizontal stem 193 or the vertical stem 192, and the fourth minute branch portion 194d obliquely extends substantially in a lower right direction from the horizontal stem 193 or the vertical stem 192.

In an exemplary embodiment, each of the first to fourth minute branch portions 194a to 194d may form an angle of about 45 degrees or 135 degrees with the gate line 121 or the horizontal stem 193. In an exemplary embodiment, first to fourth minute branch portions 194a to 194d in the adjacent subpixel areas may be substantially perpendicular to each other.

In an exemplary embodiment, the pixel electrode 191 may have the shape shown in FIG. 2, but the shape of the pixel electrode 191 is not limited to the shape shown in FIG. 2, and may be variously modified. In an exemplary embodiment, as shown in FIG. 2, a pixel area PX may be divided into four subpixel areas, but not being limited thereto. In an alternative exemplary embodiment, the pixel area PX may be divided into more than four subpixel areas. In another alternative exemplary embodiment, a pixel area PX may not be divided into a plurality of subpixel areas.

In an exemplary embodiment, a barrier layer 250 is disposed on the pixel electrode 191. The barrier layer 250 may be disposed on the first insulating layer 240, which is not covered by the pixel electrode 191. In an exemplary embodiment, the barrier layer 250 may be provided only in the pixel area PX.

The barrier layer 250 may include silicon oxide (SiOx), silicon carbide (SiCx), or the like, for example.

In an exemplary embodiment, the barrier layer 250 may functions as a lower alignment layer. In such an embodiment, the barrier layer 250 may function as an inorganic alignment layer. In such an embodiment, the barrier layer 250 may include a material which are usable as the alignment layer other than silicon oxide (SiOx), silicon carbide (SiCx), or the like.

In an exemplary embodiment, an upper alignment layer 21 is disposed on the barrier layer 250 and spaced apart from the barrier layer 250 at a constant distance. The upper alignment layer 21 may be formed only in the pixel area PX. In an exemplary embodiment, a microcavity 200 is defined between the barrier layer 250 and the upper alignment layer 21. A width and an area of the microcavity 200 may vary based on a resolution of the display device.

The upper alignment layer 21 may substantially the same material as the barrier layer 250. In one exemplary embodiment, for example, the upper alignment layer 21 may include silicon oxide (SiOx), silicon carbide (SiCx), or the like.

The barrier layer 250 and the upper alignment layer 21 may be aligned in a vertical or horizontal direction with respect to a surface of the substrate 110.

In an exemplary embodiment, a common electrode 270 is disposed on the upper alignment layer 21. The microcavity 200 may be defined, e.g., formed, between the pixel electrode 191 and the common electrode 270.

In an exemplary embodiment, a liquid crystal 3 is disposed in the microcavity 200. The liquid crystal 3 may include a plurality of liquid crystal molecules, and may be aligned substantially in a vertical direction to the substrate 110 while an electric field is not applied thereto. In such an embodiment, a vertical alignment is performed, but not being limited thereto. In an alternative exemplary embodiment, a horizontal alignment may be performed.

In an exemplary embodiment, the liquid crystal 3 may include nematic, smetic, cholesteric or chiral liquid crystal materials, for example. In an exemplary embodiment, the liquid crystal 3 may include a negative liquid crystal material or a positive liquid crystal material, for example.

In an exemplary embodiment, as described above, the pixel electrode 191 is disposed below the microcavity 200 and the common electrode 270 is disposed above the microcavity 200, but the invention is not limited thereto. In an alternative exemplary embodiment, the pixel electrode 191 and the common electrode 270 may be disposed below the entire microcavity 200. In such an embodiment, the pixel electrode 191 and the common electrode 270 may be disposed in the same layer or may be disposed in different layers with an insulating layer therebetween. In such an embodiment, the liquid crystal 3 may be provided to be inclined in a parallel direction to the substrate 110 in the microcavity 200 while an electric field is not applied thereto.

In an exemplary embodiment, the microcavity 200 is defined by the pixel electrode 191 and the common electrode 270.

In an exemplary embodiment, the common electrode 270 is directly on the first insulating layer 240 at the second valley V2, and the common electrode 270 covers a left side and a right side of the microcavity 200. In such an embodiment, common electrodes 270 in a same pixel row are connected to each other, and a height of the common electrodes 270 positioned at the second valley V2 is less than a height of the common electrode in the pixel area PX as the microcavity 200 is not defined below the common electrodes 270 at the second valley V2.

In an exemplary embodiment, the common electrode 270 may not overlap the first valley V1. In such an embodiment, the common electrode 270 does not cover the upper side and the lower side of the pixel area PX at the first valley V1, and thus a portion of the microcavity 200 is exposed by an opening 201. In an exemplary embodiment, the opening 201 extends along the first valley V1, and the liquid crystal 3 is injected into the microcavity 200 through the opening 201 during a manufacturing process.

In an exemplary embodiment, as described above, the common electrode 270 may cover the left side and the right side of the microcavity 200 and does not cover at least a part of the upper side and the lower side, but the invention is not limited thereto. In an alternative exemplary embodiment, the common electrode 270 may cover another side of the microcavity 200. In one exemplary embodiment, for example, the common electrode 270 may cover the upper side and the lower side of the microcavity 200 and not cover at least a portion of the left side and the right side. In such an embodiment, the opening 201 may extend along the second valley V2.

In an exemplary embodiment, a lower insulating layer 280 may be disposed on the common electrode 270. In an exemplary embodiment, the lower insulating layer 280 may include an inorganic insulating material such as silicon nitride (SiNx) and silicon oxide (SiOx), for example. In an alternative exemplary embodiment, the lower insulating layer 280 may be omitted.

In an exemplary embodiment, a roof layer 285 is disposed on the lower insulating layer 280. The roof layer 285 may include an organic material. The microcavity 200 is below the roof layer 285, and a shape of the microcavity 200 may be substantially maintained by the roof layer 285. The opening 201 is defined in the roof layer 285 such that at least a portion of the microcavity 200 is exposed through the roof layer 285.

In an exemplary embodiment, an upper insulating layer 290 may be disposed on the roof layer 285. The upper insulating layer 290 may include an inorganic insulating material such as silicon nitride (SiNx) and silicon oxide (SiOx), for example. In an exemplary embodiment, as shown in FIG. 4, the upper insulating layer 290 may cover substantially an entire of the upper side and a side of the roof layer 285, and the upper insulating layer 290 protects the roof layer 285 including an organic material. In an alternative exemplary embodiment, the upper insulating layer 290 may be omitted.

In an exemplary embodiment, the lower insulating layer 280 and/or the upper insulating layer 290 may include silicon oxide (SiOx). In one exemplary embodiment, for example, the lower insulating layer 280 may include silicon oxide (SiOx), and the upper insulating layer 290 may include silicon nitride (SiNx). In an alternative exemplary embodiment, both the lower insulating layer 280 and the upper insulating layer 290 may include silicon oxide (SiOx).

In an exemplary embodiment, the lower insulating layer 280 and/or the upper insulating layer 290 including the silicon oxide (SiOx) may be provided by low-temperature deposition and low-stress deposition processes. In an exemplary embodiment, the roof layer 285 is positioned between the lower insulating layer 280 and the upper insulating layer 290, and a curing process of the roof layer 285 may be performed at a high temperature such that the roof layer 285 maintains the shape of the microcavity 200. When a curing is performed at a high temperature, a lifting phenomenon and the like may occur around the opening 201 by a difference in a thermal expansion coefficient among the roof layer 285, the lower insulating layer 280 and the upper insulating layer 290. In an exemplary embodiment, where the lower insulating layer 280 and the upper insulating layer 290 includes silicon oxide (SiOx), a lifting phenomenon of the roof layer is effectively prevented by reducing the difference in a thermal expansion coefficient thereof from the roof layer 285. In such an embodiment, the microcavity 200 may have a substantially constant height, and a cell-gap may be substantially uniformly provided.

In an exemplary embodiment, an overcoat layer 295 may be disposed on the upper insulating layer 290. The overcoat layer 295 may cover the opening 201 that exposes the microcavity. In such an embodiment, the overcoat layer 295 may seal the opening 201 such that the liquid crystal 3 in the microcavity 200 is not discharged through the opening 201. The overcoat layer 295 may contact the liquid crystal 3, and the overcoat layer 295 may include a material, which does not react with the liquid crystal 3.

Next, an exemplary embodiment of a manufacturing method of a display device according to the invention will hereinafter be described with reference to FIGS. 5 to 26.

FIGS. 5 to 26 are cross-sectional views illustrating an exemplary embodiment of a manufacturing method of a display device according to another exemplary embodiment of the invention. FIGS. 5, 7, 9, 11, 13, 15, 17, 19, 21, 23, and 25 are cross-sectional views illustrated taken along a same line. Further, FIGS. 6, 8, 10, 12, 14, 16, 18, 20, 22, 24, and 26 are cross-sectional views taken along a same line.

Figure 5:
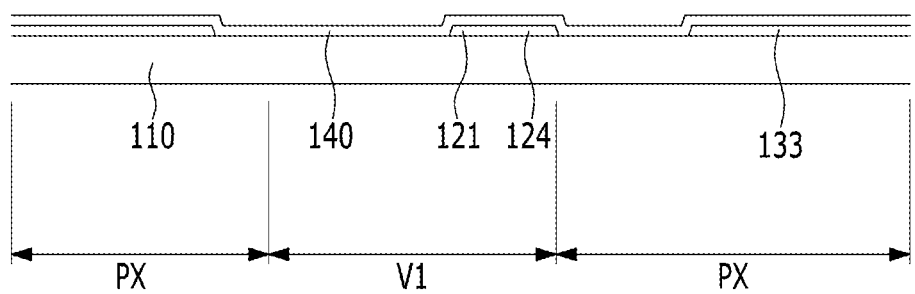
FIGS. 5 to 26 are cross-sectional views illustrating an exemplary embodiment of a manufacturing method of a display device according to the invention.
Figure 6:
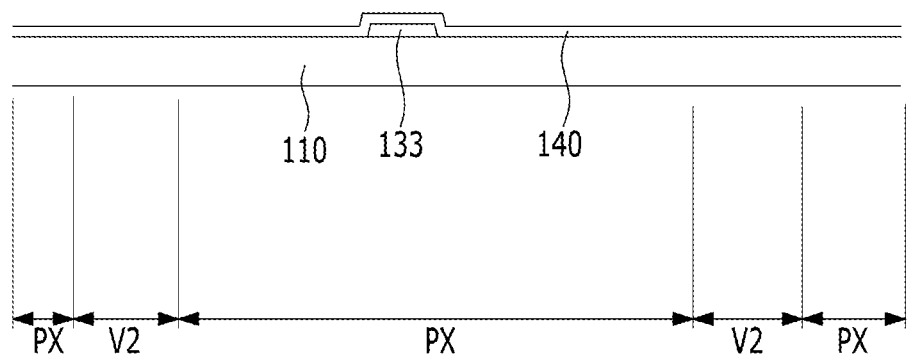

In an exemplary embodiment, as illustrated in FIGS. 5 and 6, a gate line 121 extending in a first direction and a gate electrode 124 protruding from the gate line 121 are provided, e.g., formed, on a substrate 110 including glass or plastic. In such an embodiment, a storage electrode 133 is provided to be spaced apart from the gate line 121 and the gate electrode 124. The storage electrode 133 may include the same material as the gate line 121 and the gate electrode 124.

Next, a gate insulating layer 140 is provided on substantially an entire surface of the substrate 110 including the gate line 121, the gate electrode 124 and the storage electrode 133 using an inorganic insulating material such as silicon oxide or silicon nitride. The gate insulating layer 140 may be provided in a single layer structure or a multiple layer structure.

Figure 7:
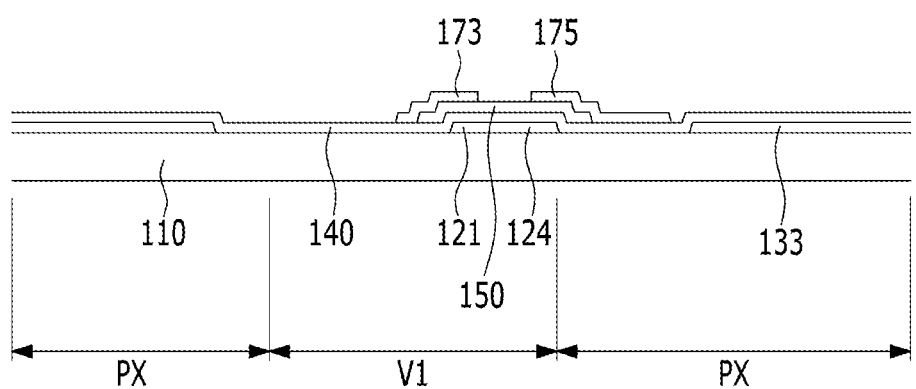
Figure 8:
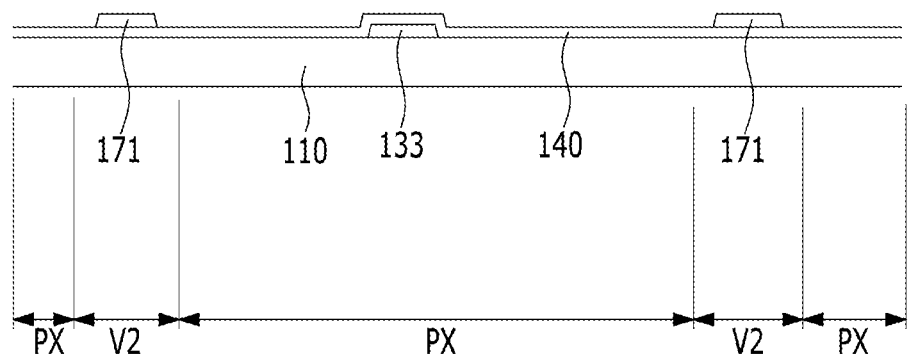

As illustrated in FIGS. 7 and 8, a semiconductor layer 150 is provided on the gate insulating layer 140 by depositing a semiconductor material such as amorphous silicon, polycrystalline silicon and metal oxide, for example, and then patterning the deposited semiconductor material. The semiconductor layer 150 may be positioned on the gate electrode 124.

Next, a data line 171 extending in a second direction is provided by depositing a conductive material, e.g., a metallic material, and then patterning the conductive material. In such an embodiment, a source electrode 173, protruding above the semiconductor layer 150 from the data line 171, and a drain electrode 175, spaced apart from the source electrode 173, are provided together. The conductive material may be provided in a single layer structure or a multiple layer structure.

In an exemplary embodiment, the semiconductor layer 150, the data line 171, the source electrode 173 and the drain electrode 175 may be provided by sequentially depositing the semiconductor material and the conductive material, e.g., the metallic material, and then patterning the semiconductor material and the conductive material at the same time. In such an embodiment, the semiconductor layer 150 is provided to extend to the bottom of the data line 171.

The gate electrode 124, the semiconductor layer 150, the source electrode 173 and the drain electrode 175 collectively define a thin film transistor. The gate line 121 and the data line 171 may be provided to cross each other, and a plurality of pixel areas PXs may be defined by the gate line 121 and the data line 171.

Figure 9:
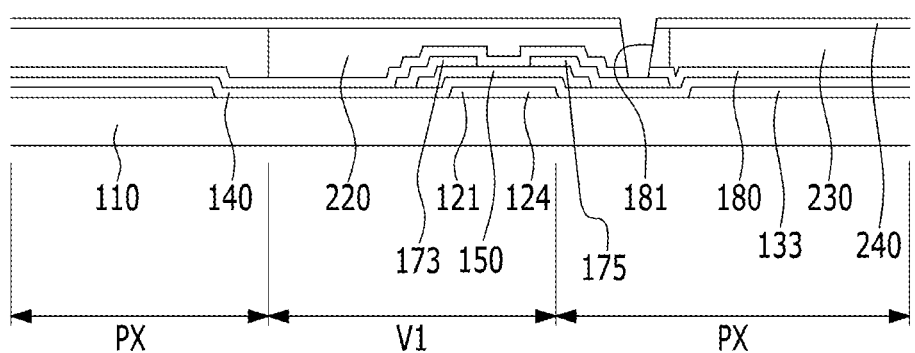
Figure 10:
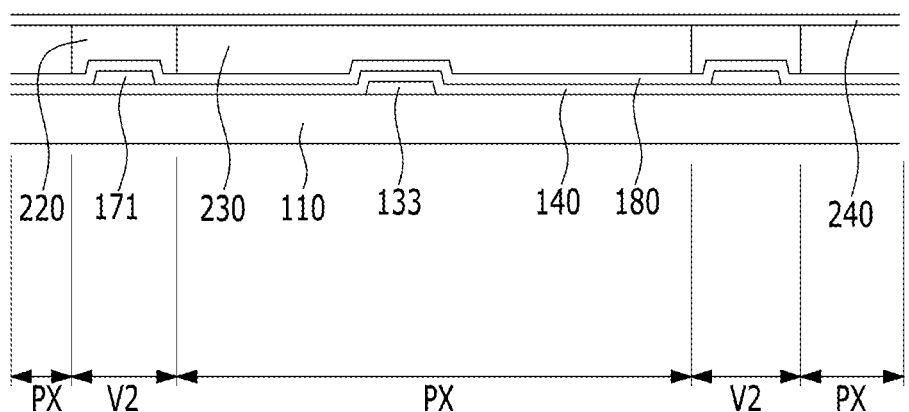

As illustrated in FIGS. 9 and 10, a passivation layer 180 is provided on the data line 171, the source electrode 173, the drain electrode 175 and the semiconductor layer 150, which is exposed between the source and drain electrodes 173 and 175. The passivation layer 180 may include an organic insulating material or an inorganic insulating material, for example, and may be provided in a single layer structure or a multiple layer structure.

Next, a color filter 230 in each pixel area PX is provided on the passivation layer 180. The color filters 230 having the same color may be provided along a same row direction of the pixel areas PXs. In an exemplary embodiment, where the color filters 230 having three colors are provided, a first colored color filter 230 is first provided and then a mask is shifted to provide a second colored color filter 230. Next, the second colored color filter 230 is provided and then the mask is shifted to provide a third colored color filter.

Next, a light blocking member 220 is provided on a boundary of the pixel areas PX on the passivation layer 180 and the thin film transistor.

In an exemplary embodiment, as described above, the light blocking member 220 is provided after forming the color filter 230, but the invention is not limited thereto. In an alternative exemplary embodiment, the light blocking member 220 may be provided, and then the color filter may be provided.

Next, a first insulating layer 240 including an inorganic insulating material such as silicon nitride (SiNx) and silicon oxide (SiOx), for example, is provided on the color filter 230 and the light blocking member 220.

Next, a contact hole 181 is formed by etching the first insulating layer 240, the light blocking member 220 and the passivation layer 180 such that a portion of the drain electrode 175 is exposed through the contact hole 181.

Figure 11:
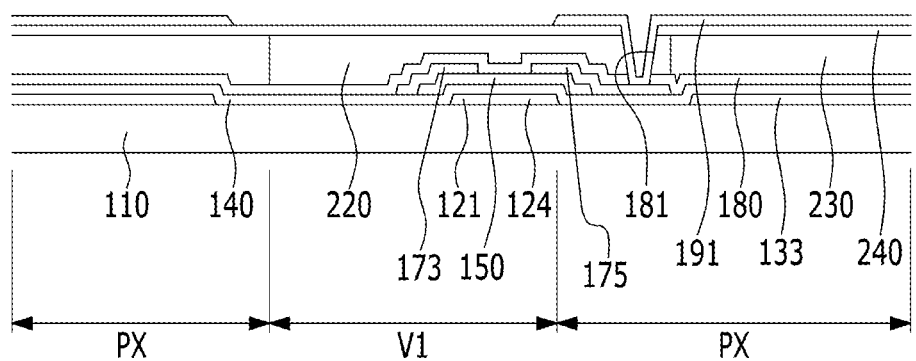
Figure 12:
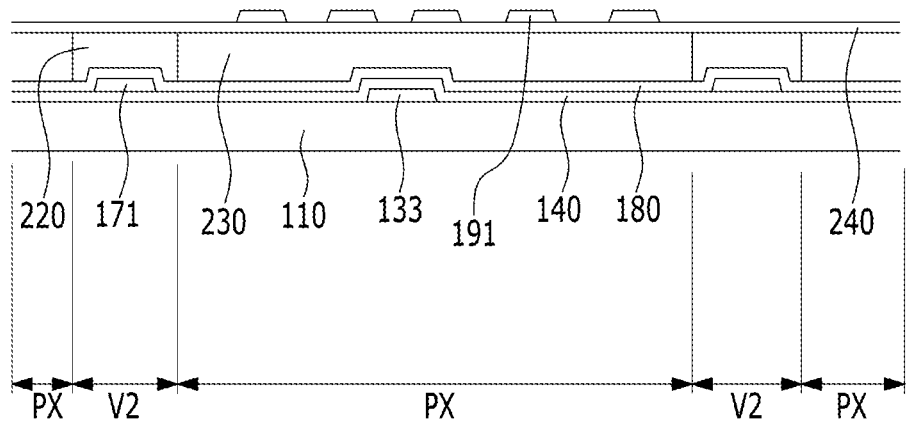

As illustrated in FIGS. 11 and 12, a pixel electrode 191 is provided in the pixel area PX on the first insulating layer 240 by depositing and patterning a transparent conductive material such as ITO and IZO, for example. The pixel electrode 191 is electrically connected to the drain electrode 175 through the contact hole 181.

Figure 13:
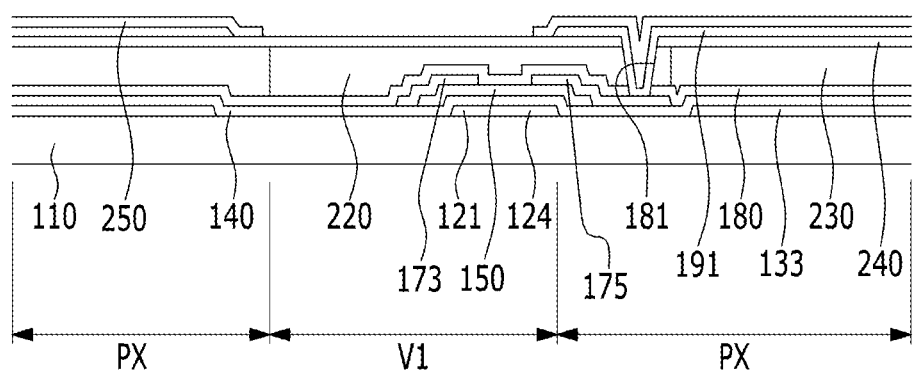
Figure 14:
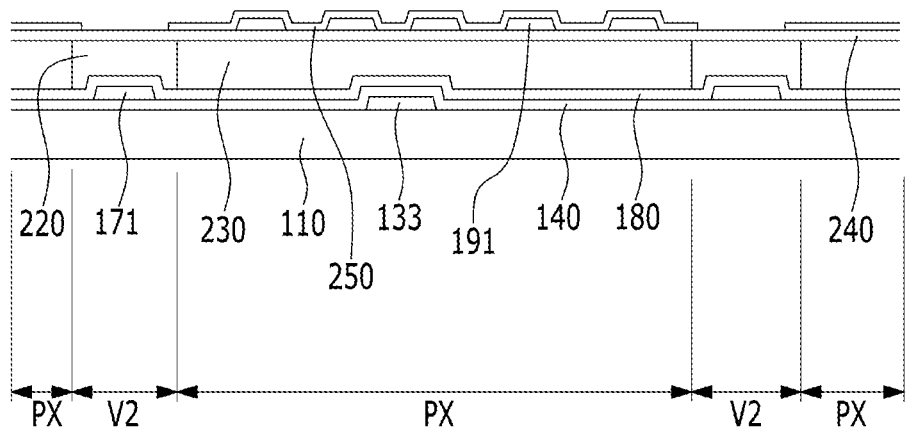

As illustrated in FIGS. 13 and 14, a barrier layer 250 is provided in the pixel area PX on the pixel electrode 191 by depositing an inorganic material, such as silicon oxide (SiOx) and silicon carbide (SiCx), for example, and then patterning the deposited inorganic material using a photolithographic process.

In an exemplary embodiment, the barrier layer 250 may be provided by a deposition process of an inorganic material using a chemical vapor deposition ("CVD") method or a sputtering method. In one exemplary embodiment, for example, the barrier layer 250 including silicon oxide (SiOx) may be deposited by injecting silicon-based gas and oxygen-based gas to chemically react the gases. In such an embodiment, a composition ratio of silicon (Si) and oxygen (O) is controlled by controlling a ratio of silicon-based gas and oxygen-based gas.

In an exemplary embodiment, the barrier layer 250 may have a vertical alignment characteristic by controlling a bonding fraction of silicon (Si)-silicon (Si) among silicon (Si) bonding fractions that exist in the barrier layer 250. In an alternative exemplary embodiment, the barrier layer 250 may be aligned by irradiating an ion beam. In such an embodiment, the barrier layer 250 may have an alignment characteristic corresponding to a lower alignment layer such that the barrier layer 250 functions as the lower alignment layer.

Figure 15:
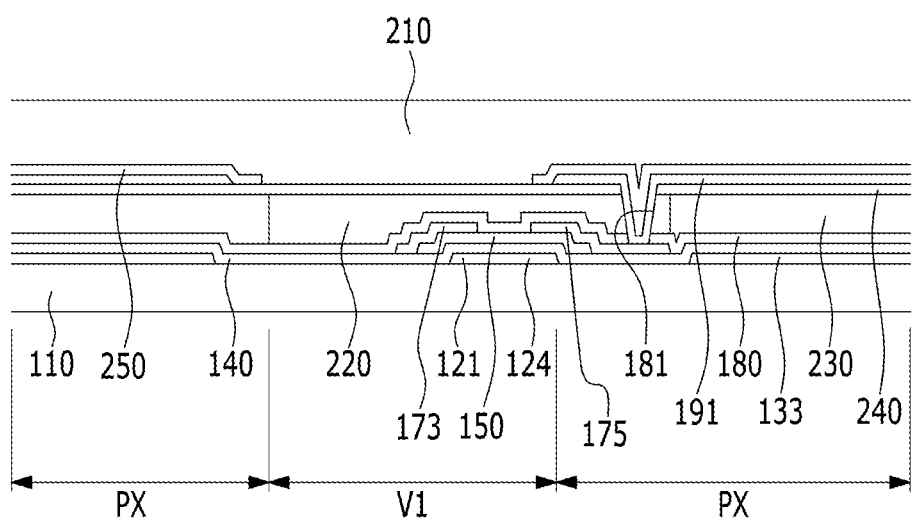
Figure 16:
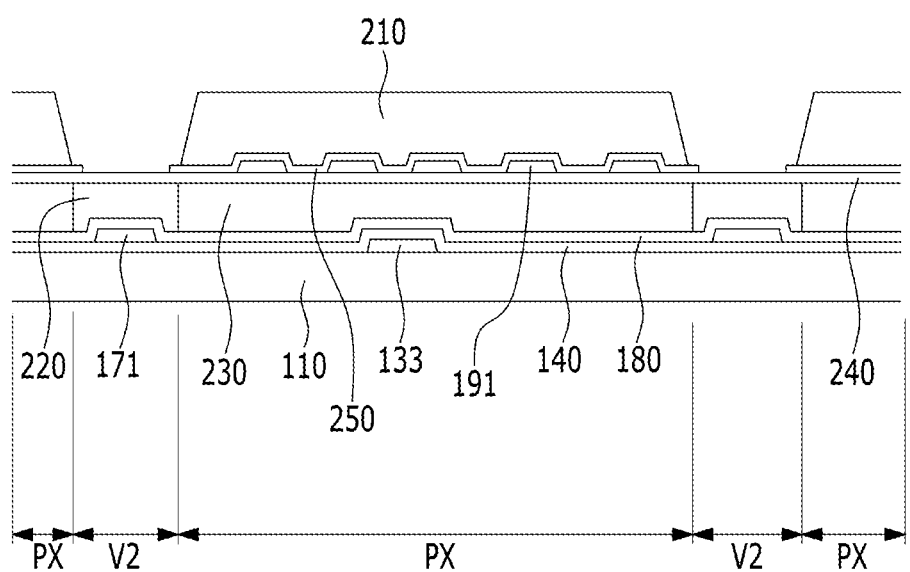

As illustrated in FIGS. 15 and 16, a sacrificial layer 210 including an organic insulating material is provided on the barrier layer 250. The pixel areas PXs, which are adjacent to each other in the first direction, are separated from each other by patterning the sacrificial layer 210, and the sacrificial layer 210 is provided to be connected along the pixel areas PXs, which are adjacent to each other in the second direction. In one exemplary embodiment, for example, the sacrificial layers 210 provided in the pixel areas in the same pixel row may be separated from each other, and the sacrificial layers 210 provided in the pixel areas in the same pixel column may be connected to each other. In such an embodiment, the sacrificial layers 210 are provided along the pixel column.

In an exemplary embodiment, the sacrificial layer 210 may include a photosensitive polymer material, and the sacrificial layer 210 may be patterned by performing a photo process.

Figure 17:
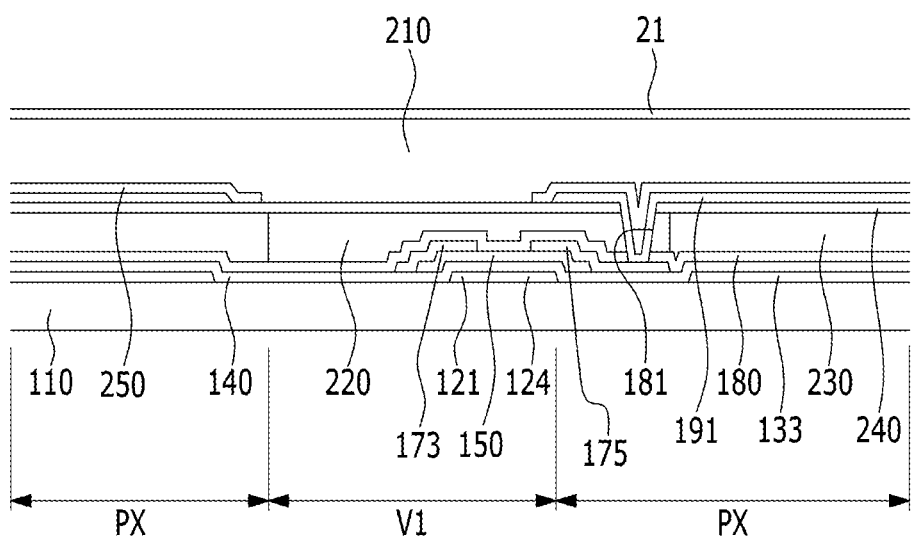
Figure 18:
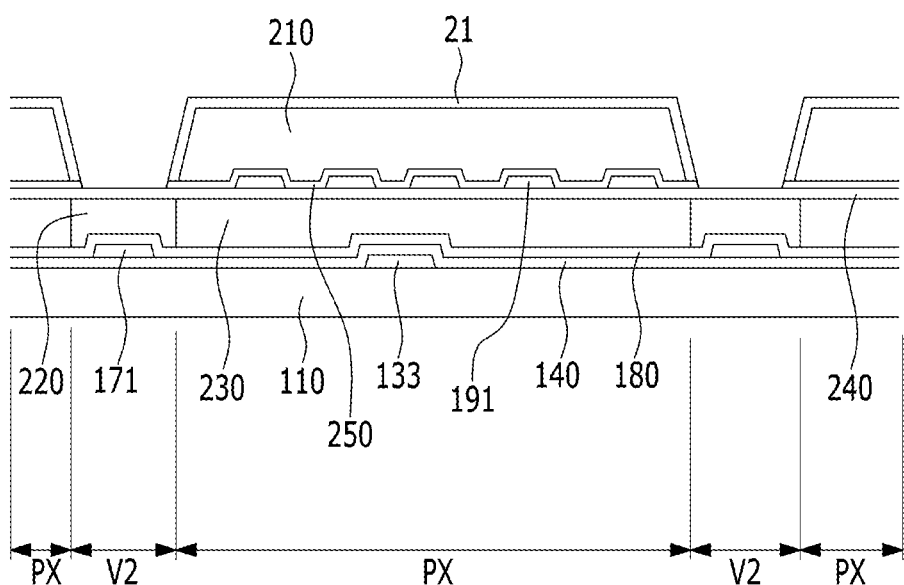

As illustrated in FIGS. 17 and 18, an upper alignment layer 21 is provided in the pixel area PX on the sacrificial layer 210 by depositing an inorganic material, such as silicon oxide (SiOx) and silicon carbide (SiCx), for example, and then patterning the deposited inorganic material using a photolithographic process. The upper alignment layer 21 may be provided at a first valley V1 in addition to the pixel area PX.

In an exemplary embodiment, the upper alignment layer 21 may have substantially the same pattern as the sacrificial layer 210. In such an embodiment, the upper alignment layer 21 may be provided to cover the side of the sacrificial layer 210 on the boundary of the pixel area PX, as illustrated in FIG. 18.

The upper alignment layer 21 may be provided using a chemical vapor deposition process or a sputtering deposition process, and the upper alignment layer 21 may have an alignment characteristic.

In an exemplary embodiment of the invention, the lower alignment layer and the upper alignment layer 21 are inorganic alignment layers. In such an embodiment, aggregation of the alignment layers is effectively prevented. When an organic alignment layer is provided by injecting and drying an aligning agent, aggregation may occur while injecting the aligning agent. In an exemplary embodiment of the invention, the lower alignment layer and the upper alignment layer 21 are provided through a deposition process, such that aggregation is effectively prevented.

Figure 19:
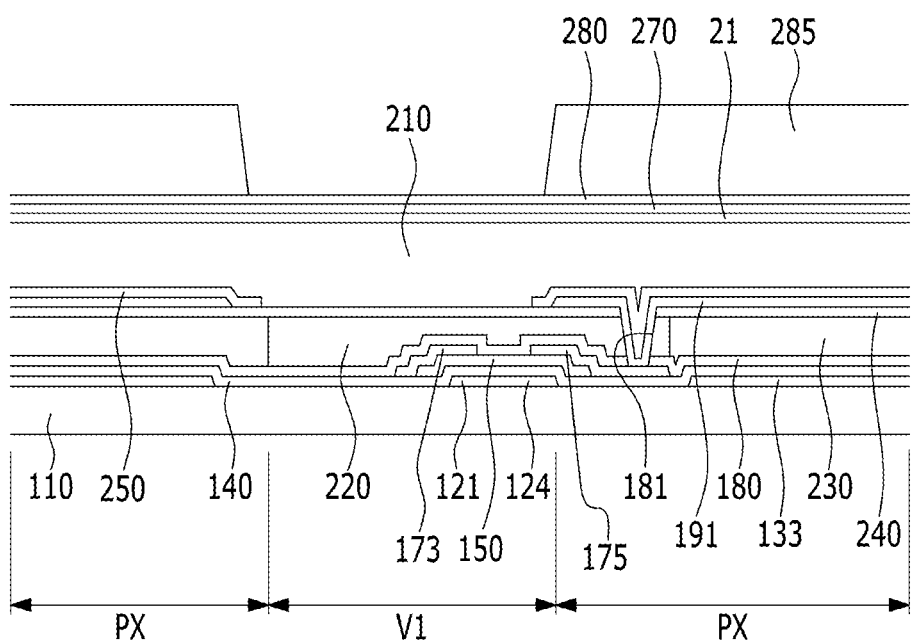
Figure 20:
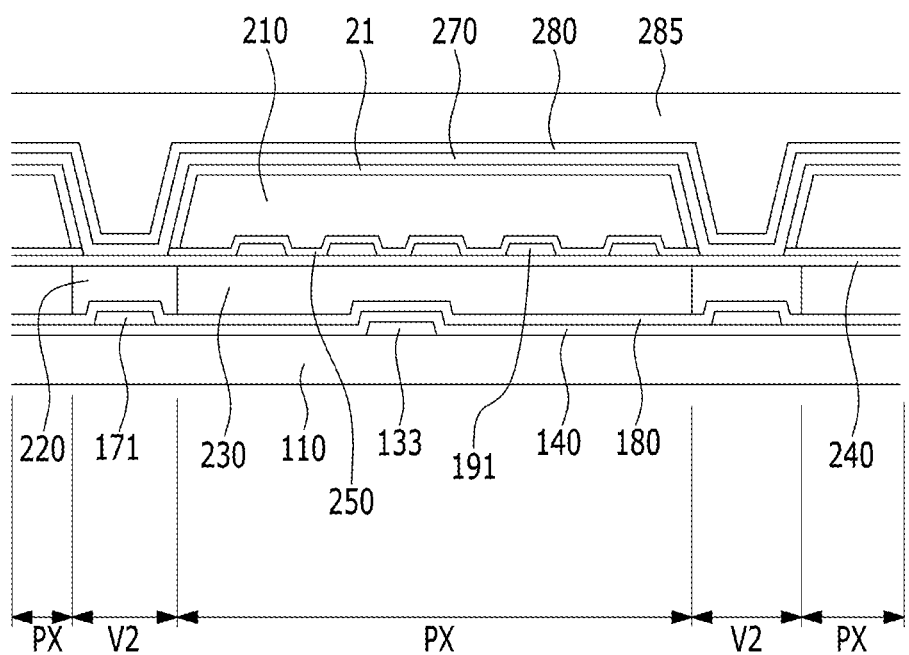

As illustrated in FIGS. 19 and 20, a common electrode 270 is provided by depositing a conductive material, e.g., a metallic material, on the upper alignment layer 21.

Next, a lower insulating layer 280 may be provided on the common electrode 270 using an inorganic insulating material, such as silicon oxide and silicon nitride, for example.

Next, a roof layer 285 is provided on the lower insulating layer 280 using an organic material. A portion of the roof layer 285 at the first valley V1 may be removed by patterning the roof layer 285.

Figure 21:
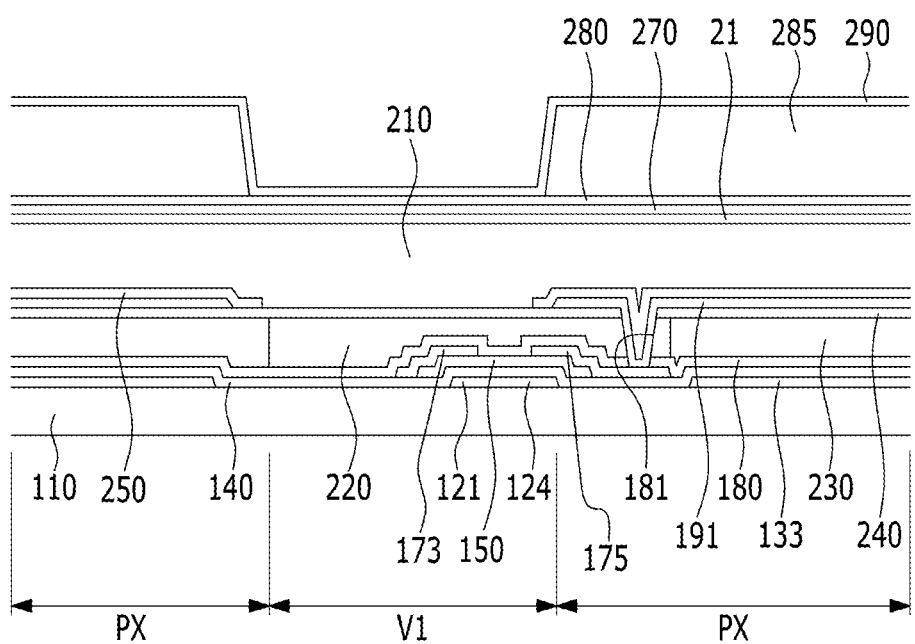
Figure 22:
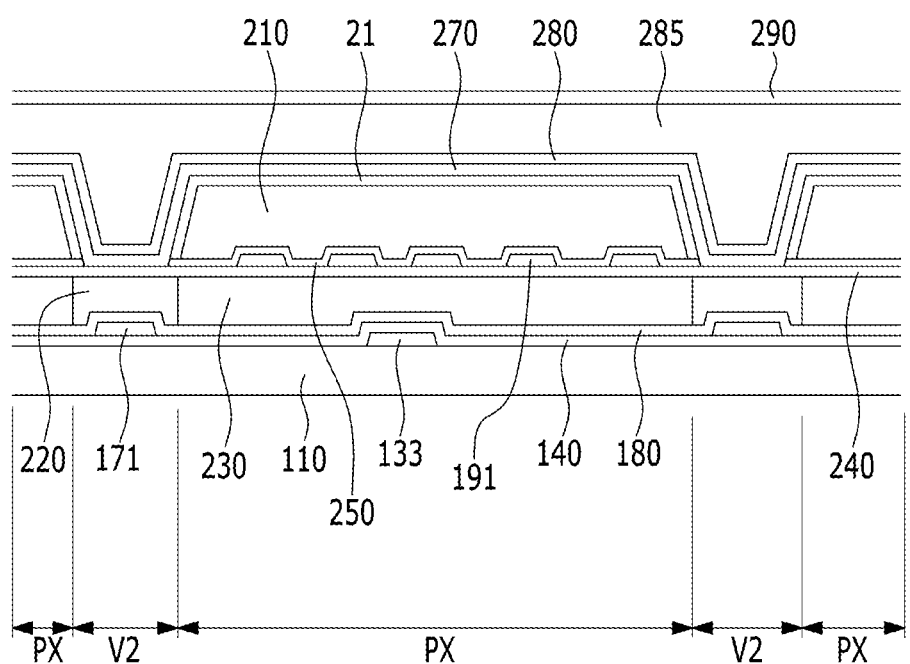

As illustrated in FIGS. 21 and 22, an upper insulating layer 290 including an inorganic insulating material, such as silicon nitride (SiNx) and silicon oxide (SiOx), for example, may be provided on the roof layer 285. The upper insulating layer 290 is provided on the patterned roof layer 285 to cover and protect the side of the roof layer 285.

Figure 23:
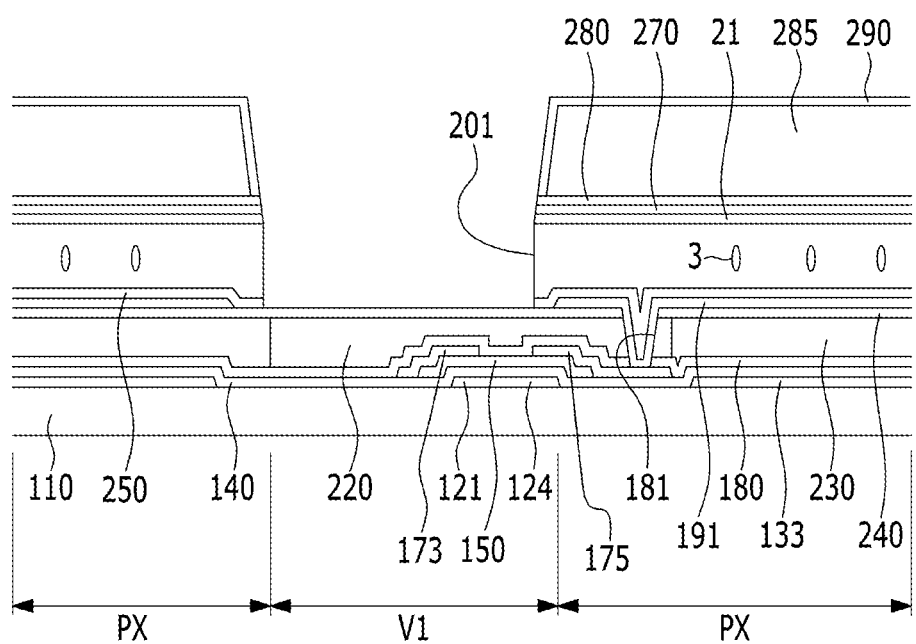
Figure 24:
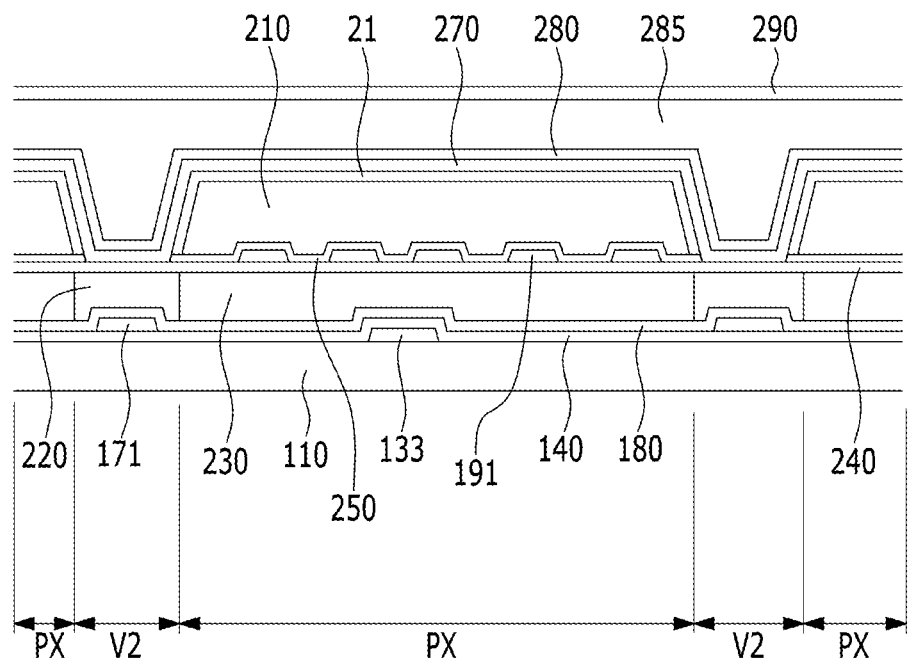

As illustrated in FIGS. 23 and 24, portions of the upper insulating layer 290 positioned at the first valley V1, the lower insulating layer 280 and the common electrode 270 are removed by patterning the upper insulating layer 290, the lower insulating layer 280 and the common electrode 270. Accordingly, the sacrificial layer 210 positioned below a portion, where the common electrode 270 is removed, is exposed.

Substantially an entire of the sacrificial layer 210 is removed by supplying a developer on the substrate 110, where the sacrificial layer 210 is exposed, and the remaining sacrificial layer 210 is ashed by supplying oxygen plasma. When the sacrificial layer 210 is removed, the microcavity 200 is defined at a space that the sacrificial layer 210 occupies. In such an embodiment, the barrier layer 250 and the upper alignment layer 21 is spaced apart from each other with the microcavity 200 interposed therebetween, and the pixel electrode 191 and the roof layer 285 is spaced apart from each other with the microcavity interposed therebetween.

In an exemplary embodiment, the microcavity 200 is exposed through a portion where the roof layer 285 is not provided, that is, the opening 201. In an exemplary embodiment, the opening 201 may be provided along the first valley V1. In an alternative exemplary embodiment, the opening 201 may be provided along the second valley V2.

Next, the roof layer 285 is cured by heating the substrate 110 such that the shape of the microcavity 200 is substantially maintained by the roof layer 285. A lifting phenomenon of the roof layer 285 may occur by a difference in a thermal expansion coefficient between the roof layer 285 and the lower insulating layer 280 and the upper insulating layer 290 which are positioned below and above the roof layer 285. In an exemplary embodiment of the invention, the lower insulating layer 280 and the upper insulating layer 290 include silicon oxide (SiOx), such that the lifting phenomenon of the roof layer 285 is effectively prevented. In an exemplary embodiment, both the lower insulating layer 280 and the upper insulating layer 290 may include silicon oxide (SiOx). In an alternative exemplary embodiment, and the lower insulating layer 280 may include silicon oxide (SiOx) and the upper insulating layer 290 may be made of silicon nitride (SiNx).

Next, the liquid crystal 3 including liquid crystal molecules is provided on the substrate 110 by an inkjet method or a dispensing method, such that the liquid crystal 3 is injected into the microcavity 200 through the opening 201. In an exemplary embodiment, the liquid crystal 3 is dropped in the opening 201 provided along the odd-numbered first valley V1 and is not dropped in the opening 201 provided along the even-numbered first valley V1. In an alternative exemplary embodiment, the liquid crystal 3 may be dropped in the opening 201 provided along the even-numbered first valley V1 and may not be dropped in the opening 201 provided along the odd-numbered first valley V1.

In an exemplary embodiment, where the liquid crystal 3 is dropped in the opening 201 provided along the odd-numbered first valley V1, the liquid crystal 3 passes through the opening 201 by capillary force to be injected into the microcavity 200. In such an embodiment, the liquid crystal 3 is injected into the microcavity 200 by discharging air in the microcavity 200 through the opening 201 provided along the even-numbered first valley V1.

In an exemplary embodiment, the liquid crystal 3 may be dropped in all the openings 201. In such an embodiment, the liquid crystal 3 may be dropped in the opening 201 provided along the odd-numbered first valley V1 and the opening 201 provided along the even-numbered first valley V1.

Figure 25:
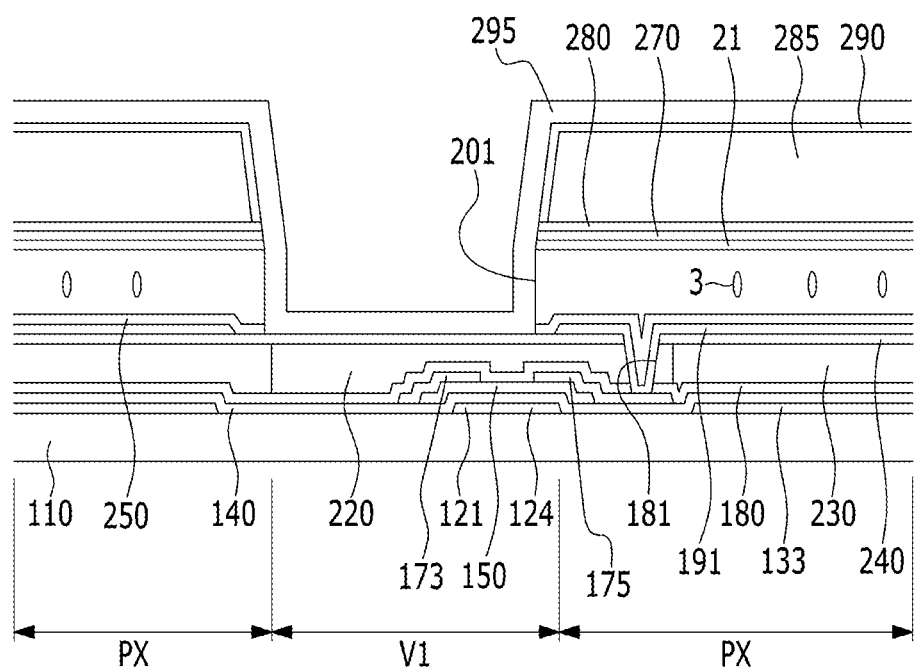
Figure 26:
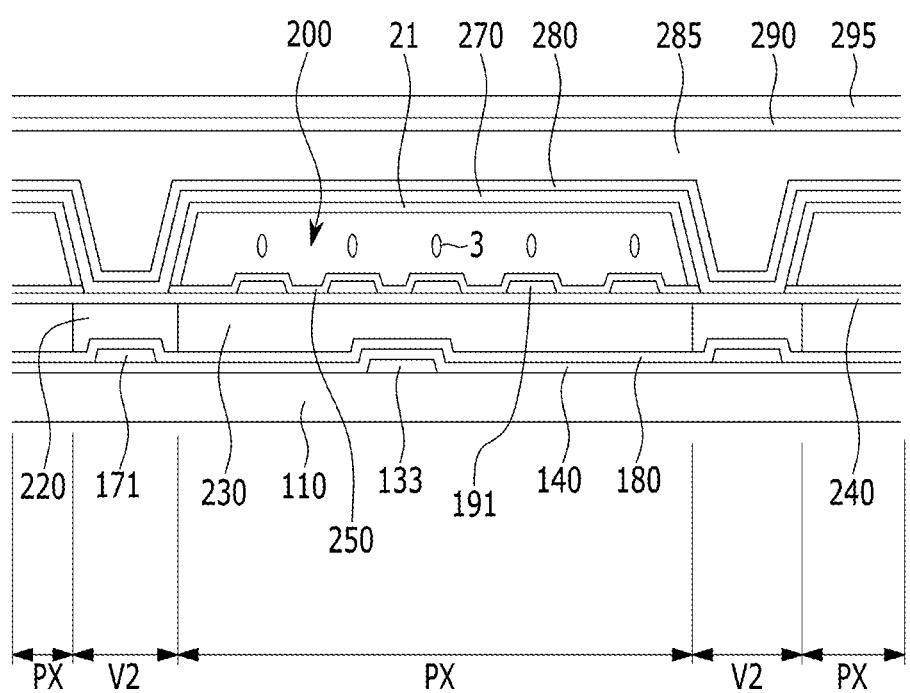

As illustrated in FIGS. 25 and 26, an overcoat layer 295 is provided on the upper insulating layer 290 by depositing a material which does not react with the liquid crystal 3. The overcoat layer 295 is provided to cover the opening 201 that exposes the microcavity and to seal the microcavity 200 in each pixel area PX.

Next, an alternative exemplary embodiment of a display device according to an exemplary embodiment of the invention will hereinafter be described with reference to FIGS. 27 and 28.

Figure 27:
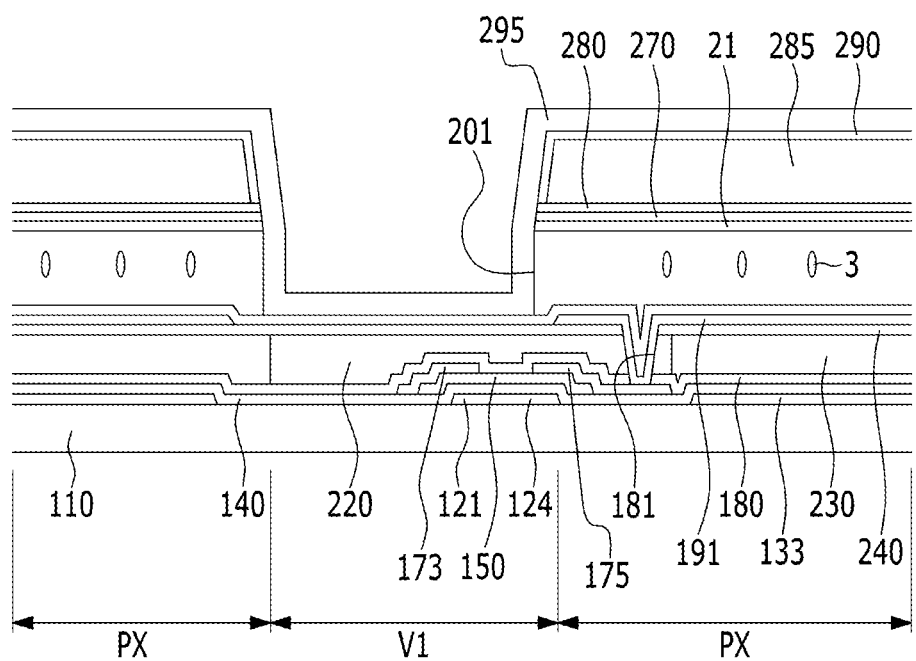
FIGS. 27 to 28 are partial cross-sectional views of an alternative exemplary embodiment of a display device according to the invention.
Figure 28:
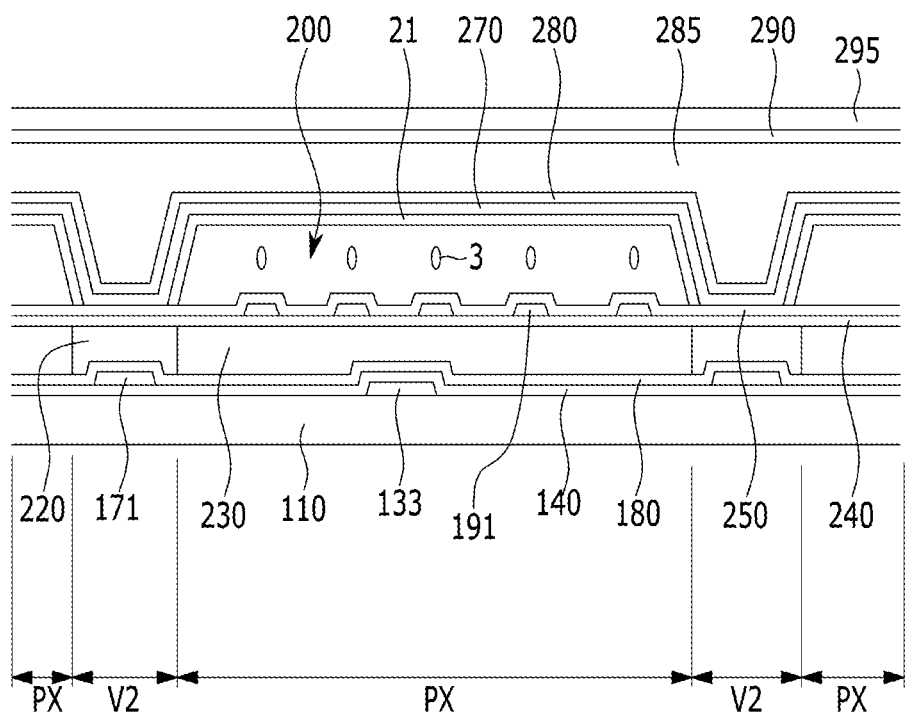

FIGS. 27 to 28 are partial cross-sectional views illustrating an alternative exemplary embodiment of a display device according to the invention, which are cross-sectional views taken along different lines.

The display device illustrated in FIGS. 27 and 28 is substantially the same as the display device illustrated in FIGS. 1 to 4 except for a pattern of the barrier layer. The same or like elements shown in FIGS. 27 and 28 have been labeled with the same reference characters as used above to describe the exemplary embodiments of the display device shown in FIGS. 1 to 4, and any repetitive detailed description thereof will hereinafter be omitted or simplified.

An exemplary embodiment of the display device includes a thin film transistor and a pixel electrode 191 connected to the thin film transistor, which are disposed on the substrate 110. A barrier layer 250 is disposed on the pixel electrode 191, and a roof layer 285 is disposed on the barrier layer 250 and spaced apart from the barrier layer 250 with a microcavity 200 therebetween. An opening 201 is defined in the roof layer 285 and exposes a portion of the microcavity 200, and the liquid crystal 3 is disposed in the microcavity 200. An overcoat layer 295 is disposed on the roof layer 285 and covers the opening 201, and the overcoat layer 295 seals the microcavity 200 for each pixel area PX.

In an exemplary embodiment, as shown in FIGS. the barrier layer 250 is disposed on substantially an entire surface of the substrate 110 including the pixel area PX.

A color filter 230 and a light blocking material 220 are disposed below the barrier layer 250, and the color filter 230 and the light blocking material 220 may include an organic material.

A sacrificial layer (not illustrated) is provided on the barrier layer 250 and the sacrificial layer is removed to form the microcavity 200. An ashing process using oxygen plasma may be performed to remove the sacrificial layer. During a removing process of the sacrificial layer, a layer positioned below the microcavity 200 may be damaged, and the color filter 230 and the light blocking material 220 may be exposed, such that an inner portion of the microcavity 200 may be contaminated. In an exemplary embodiment of the invention, the barrier layer 250 positioned below the microcavity 200 includes silicon oxide (SiOx), such that the barrier layer 250 is effectively prevented from being damaged during the removing process of the sacrificial layer, the inner portion of the microcavity 200 is thereby effectively prevented from being contaminated due to exposure of the color filter 230 and the light blocking material 220.

In an exemplary embodiment of the invention, the barrier layer 250 is disposed at the first valley V1 and the second valley V2 in addition to the pixel area PX. In such an embodiment, the color filter 230 and the light blocking material 220 are effectively prevented from being exposed inside the microcavity 200 and outside the microcavity 200.

Next, another alternative exemplary embodiment of a display device according to the invention will hereinafter be described with reference to FIGS. 29 and 30.

Figure 29:
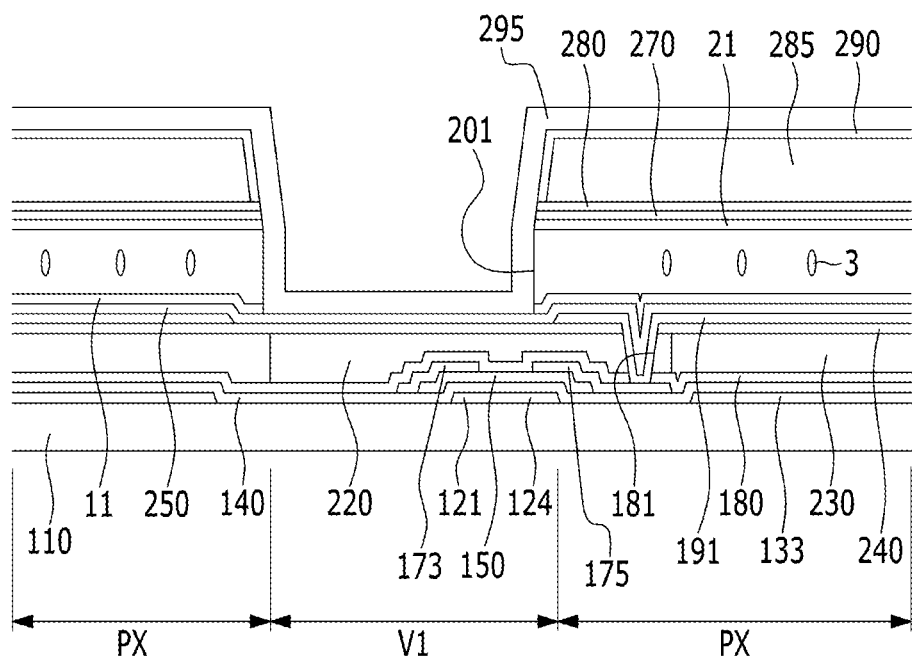
FIGS. 29 to 30 are partial cross-sectional views of another alternative exemplary embodiment of a display device according to the invention.
Figure 30:
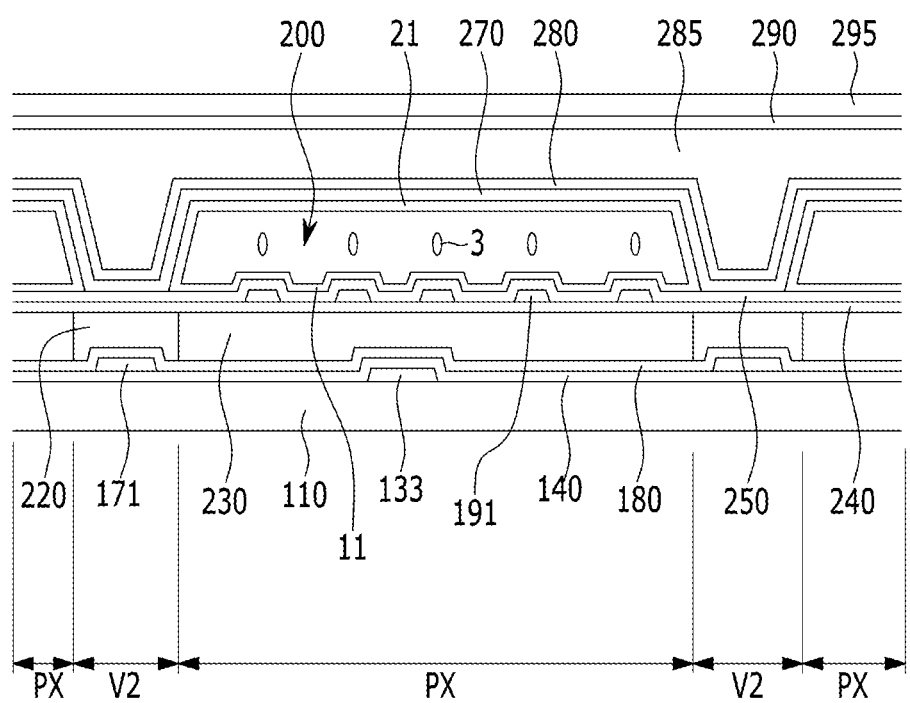

FIGS. 29 to 30 are partial cross-sectional views illustrating another alternative exemplary embodiment of a display device according to the invention, which are cross-sectional views taken along different lines.

The display device illustrated in FIGS. 29 and 30 is substantially the same as the display device illustrated in FIGS. 27 to 28, the description thereof is omitted except that a lower alignment layer is provided separately from the barrier layer, and a lower alignment layer and an upper alignment layer include organic materials. The same or like elements shown in FIGS. 29 and 30 have been labeled with the same reference characters as used above to describe the exemplary embodiments of the display device shown in FIGS. 27 to 28, and any repetitive detailed description thereof will hereinafter be omitted or simplified.

In an exemplary embodiment, the display device includes a thin film transistor and a pixel electrode 191 connected to the thin film transistor, which are disposed on a substrate 110.

In an exemplary embodiment, a barrier layer 250 is disposed on the pixel electrode 191 and overlapping an entire surface of the substrate 110 including pixel areas PXs, but not being limited thereto. In an alternative exemplary embodiment, the barrier layer 250 may be disposed only in the pixel area PX.

In an exemplary embodiment, a roof layer 285 is disposed on the barrier layer 250 and spaced apart from the barrier layer 250 with a microcavity 200 therebetween.

In an exemplary embodiment, a lower alignment layer 11 and an upper alignment layer 21 are disposed on an inner wall of the microcavity 200. The lower alignment layer 11 is disposed on the barrier layer 250, and the upper alignment layer 21 is disposed below the roof layer 285 with the upper alignment 21 and the microcavity 200 therebetween. The lower and upper alignment layers 11 and 21 may be connected to each other at an edge of the pixel area PX.

Each of the lower alignment layer 11 and the upper alignment layer 21 may include an organic material such as polyamic acid, polysiloxane and polyimide, for example. The lower alignment layer 11 and the upper alignment layer 21 may be vertically or horizontally aligned.

Next, an alternative exemplary embodiment of a manufacturing method of a display device according to the invention will hereinafter be described with reference to FIGS. 31 to 42.

FIGS. 31 to 42 are cross-sectional views illustrating an alternative exemplary embodiment of a manufacturing method of a display device according to the invention. FIGS. 31, 33, 35, 37, 39 and 41 are cross-sectional views illustrated along the same line. FIGS. 32, 34, 36, 38, 40 and 42 are cross-sectional views illustrated along the same line.

Figure 31:
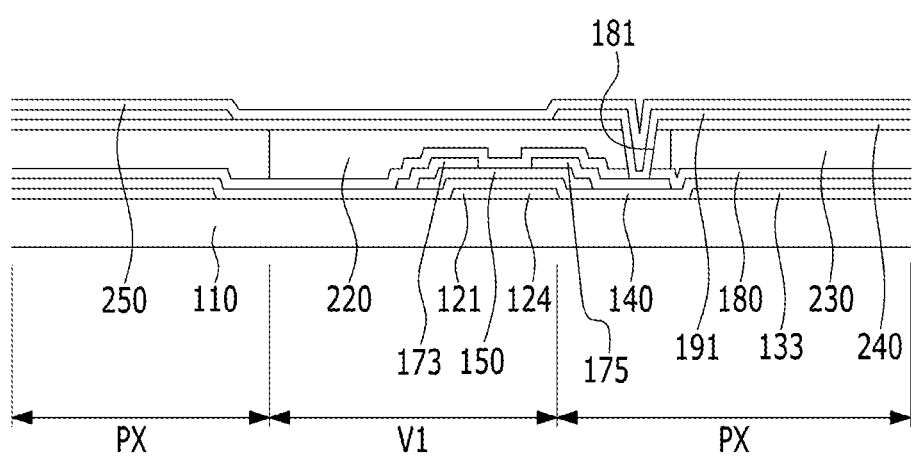
FIGS. 31 to 42 are cross-sectional views illustrating an alternative exemplary embodiment of a manufacturing method of a display device according to the invention.
Figure 32:
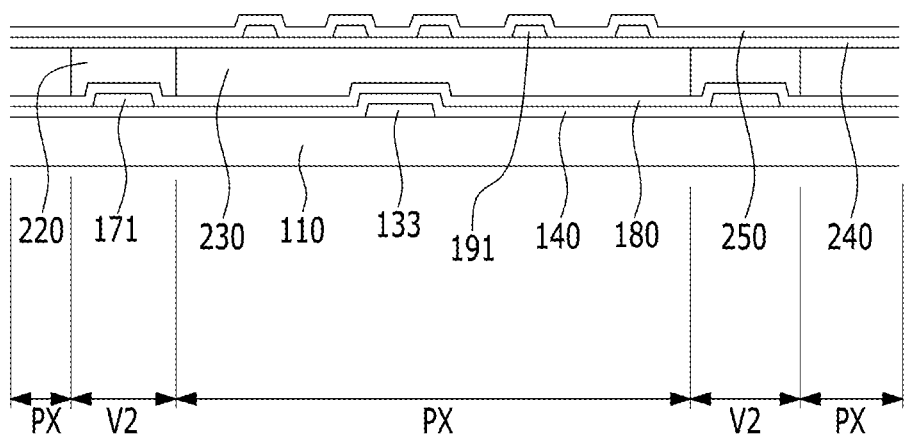

In an exemplary embodiment, as illustrated in FIGS. 31 and 32, a gate line 121, a gate electrode 124 and a storage electrode 133 are provided on a substrate 110, and a gate insulating layer 140 is provided on substantially the entire surface of the substrate 110 including the gate line 121, the gate electrode 124 and the storage electrode 133.

Next, a semiconductor layer 150 is provided on the gate insulating layer 140. The semiconductor layer 150 may overlap the gate electrode 124.

Next, a data line 171, a source electrode 173 protruding from the data line 171 and overlapping the semiconductor layer 150, and a drain electrode 175 spaced apart from the source electrode 173 are provided by depositing a conductive material, e.g., a metallic material, and then patterning the deposited conductive material.

Next, a passivation layer 180 is provided on the data line 171, the source electrode 173, the drain electrode 175 and the semiconductor layer 150, which is exposed between the source and drain electrodes 173 and 175.

Next, a color filter 230 and a light blocking member 220 are provided on the passivation layer 180, and a first insulating layer 240 is provided on the color filter 230 and the light blocking member 220.

Next, a contact hole 181 is provided, e.g., formed, by etching the first insulating layer 240, the light blocking member 220 and the passivation layer 180 to expose a part of the drain electrode 175, and a pixel electrode 191 connected to the drain electrode 175 is provided on the first insulating layer 240.

Next, a barrier layer 250 is provided on the pixel electrode 191 by depositing an inorganic insulating material such as silicon oxide (SiOx) and silicon carbide (SiCx), for example. In an exemplary embodiment, the barrier layer 250 may be provided on substantially the entire surface of the substrate 110. In an alternative exemplary embodiment, the barrier layer 250 may be provided only in the pixel area PX by patterning the barrier layer 250.

The barrier layer 250 may be provided by a chemical vapor deposition method or a sputtering deposition method.

In such an embodiment, the barrier layer 250 serves to protect the color filter 230 and the light blocking member 220.

Figure 33:
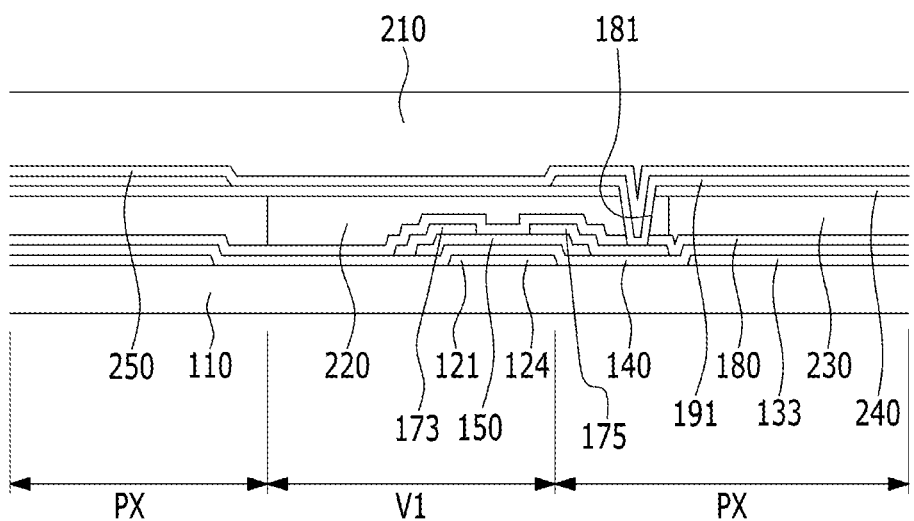
Figure 34:
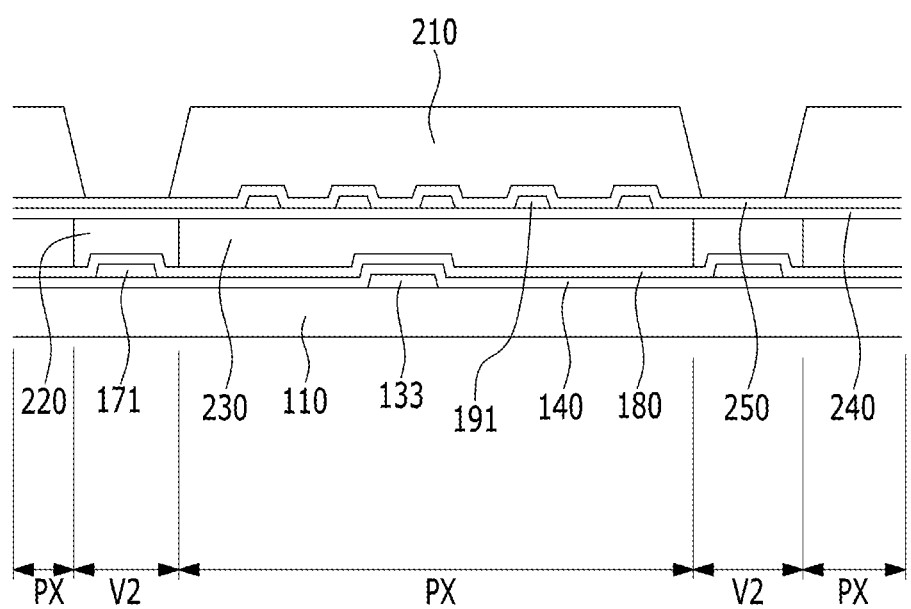

As illustrated in FIGS. 33 and 34, a sacrificial layer 210 including an organic insulating material is provided on the barrier layer 250.

Figure 35:
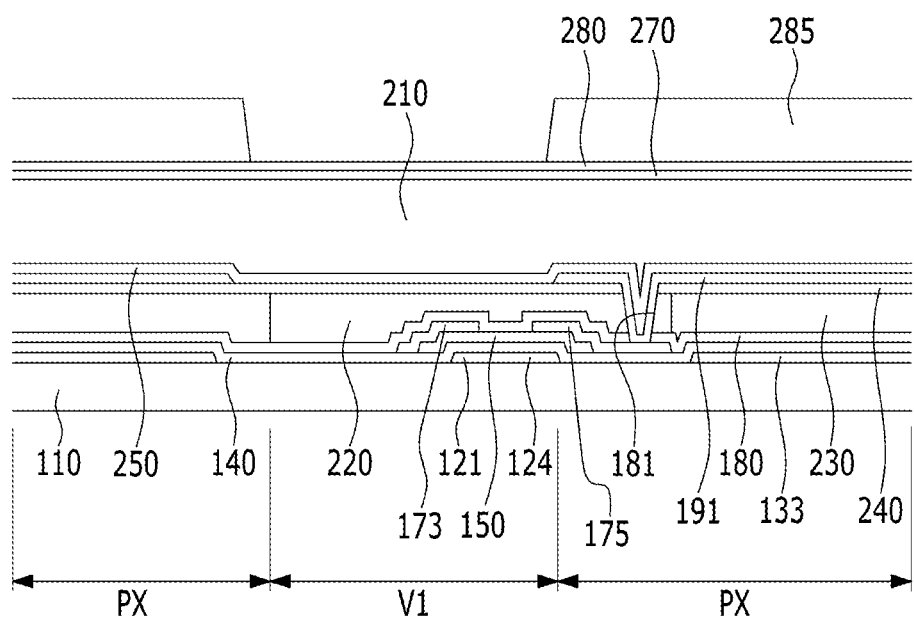
Figure 36:
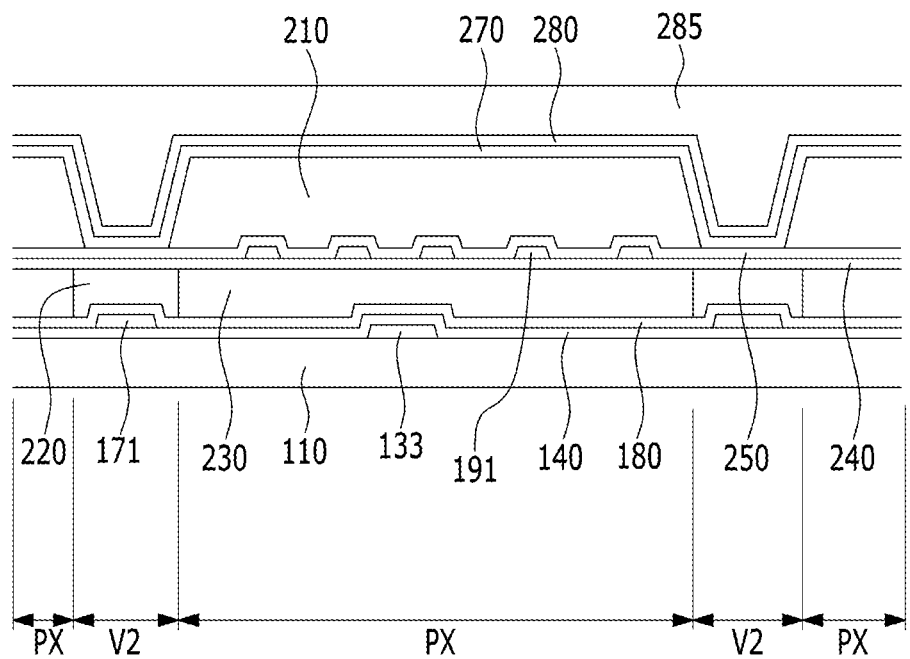

As illustrated in FIGS. 35 and 36, a common electrode 270 is provided on the sacrificial layer 210 by depositing a conductive material, e.g., metallic material, and a lower insulating layer 280 and a roof layer 285 are sequentially provided.

Figure 37:
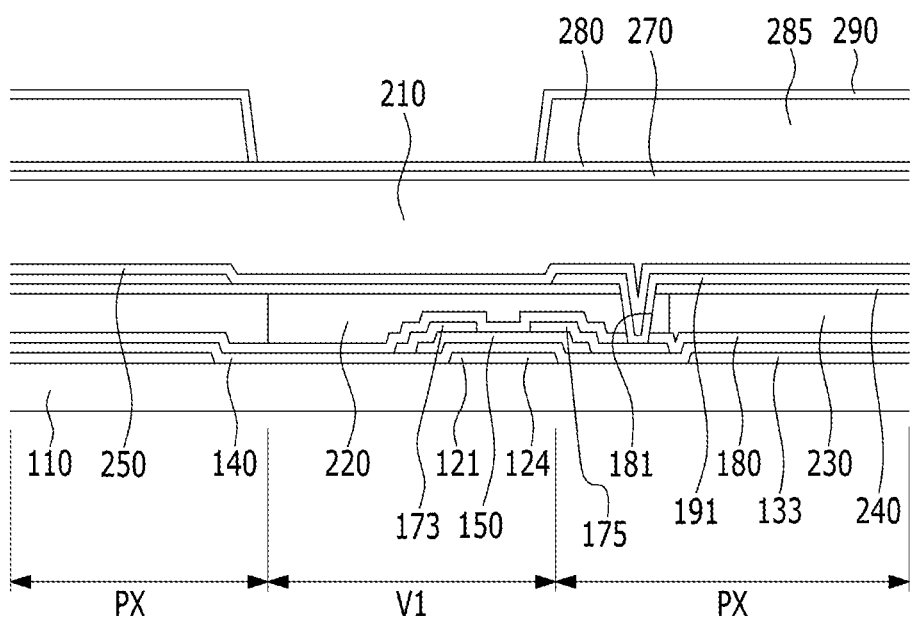
Figure 38:
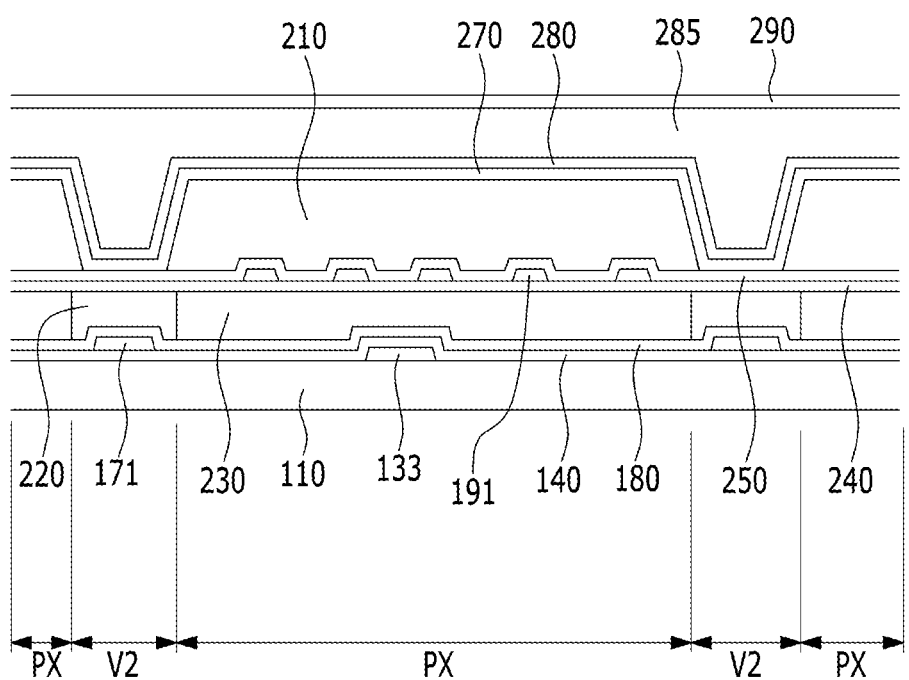

As illustrated in FIGS. 37 and 38, an upper insulating layer 290 is provided on the roof layer 285.

In an exemplary embodiment, as described above, both the lower insulating layer 280 and the upper insulating layer 290 may include silicon oxide (SiOx). In an alternative exemplary embodiment, the lower insulating layer 280 may include silicon oxide (SiOx), and the upper insulating layer 290 may include silicon nitride (SiNx).

Figure 39:
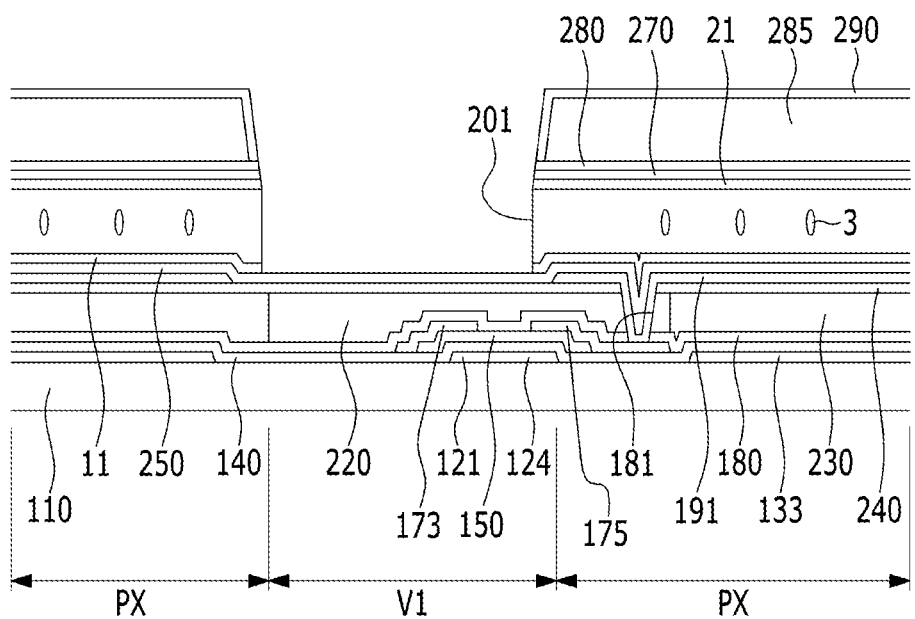
Figure 40:
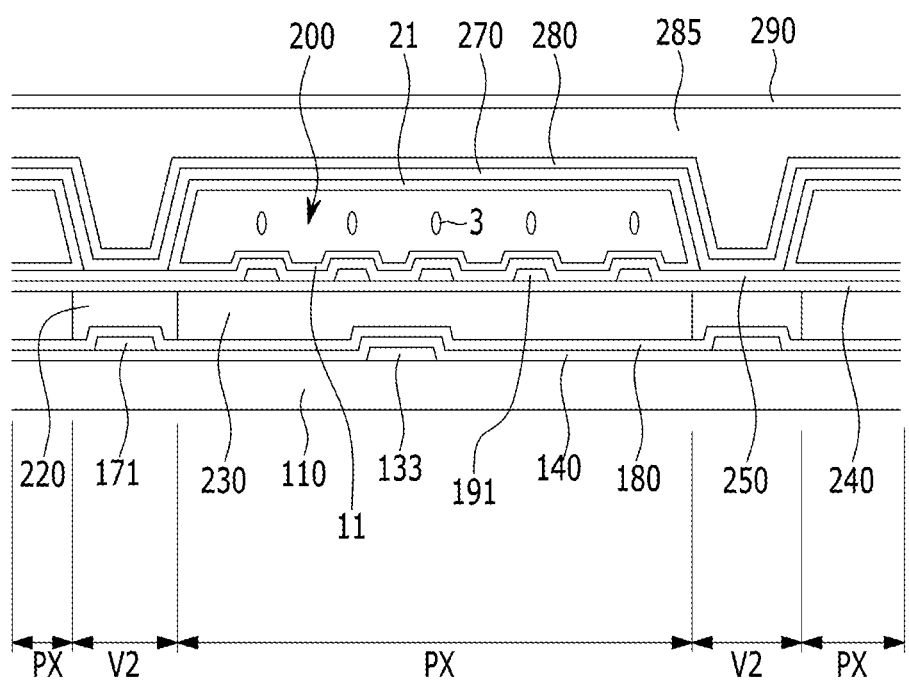

As illustrated in FIGS. 39 and 40, an opening 201 is provided by patterning the upper insulating layer 290, the lower insulating layer 280 and the common electrode 270, and then the sacrificial layer 210 is removed to form a microcavity 200.

Next, when an aligning agent containing an organic alignment material is dropped on the substrate 110 by a spin coating method or an inkjet method, the aligning agent is injected into the microcavity 200 through the opening 201. When the aligning agent is injected into the microcavity 200 and then a curing process is performed, a solution component is evaporated and the alignment material remains on the inner wall of the microcavity 200.

Accordingly, the lower alignment layer 11 is provided on the barrier layer 250, and the upper alignment layer 21 may be provided below the roof layer 285. The lower alignment layer 11 and the upper alignment layer 21 are disposed opposite to each other with the microcavity 200 therebetween and are connected to each other at an edge of the pixel area. The common electrode 270 has a side wall that covers the side of the microcavity 200 in a direction substantially parallel to the data line 171 at a portion adjacent to the data line 171, and the alignment material remains even in the inner surface of the side wall.

In such an embodiment, the lower and upper alignment layers 11 and 21 may be aligned substantially in a vertical direction with respect to the substrate 110 except for the side of the microcavity 200. In an alternative exemplary embodiment, a process of irradiating an ultraviolet ("UV") to the lower and upper alignment layers 11 and 21 is performed such that the lower and upper alignment layers 11 and 21 are aligned substantially in a horizontal direction with respect to the substrate 110.

Next, when the liquid crystal 3 is dropped on the substrate 110, the liquid crystal 3 is injected into the microcavity 200 through the opening 201.

Figure 41:
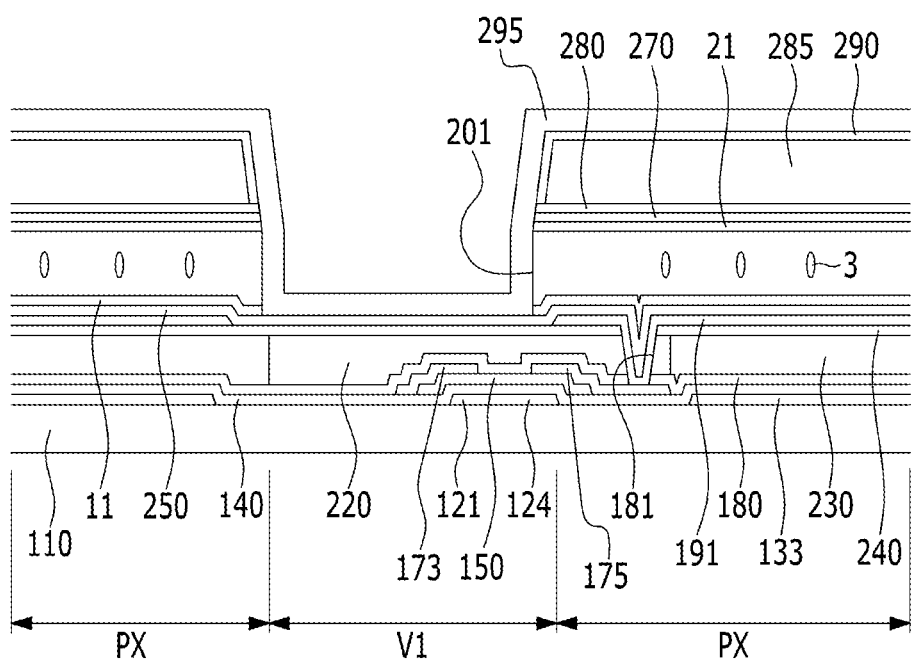
Figure 42:
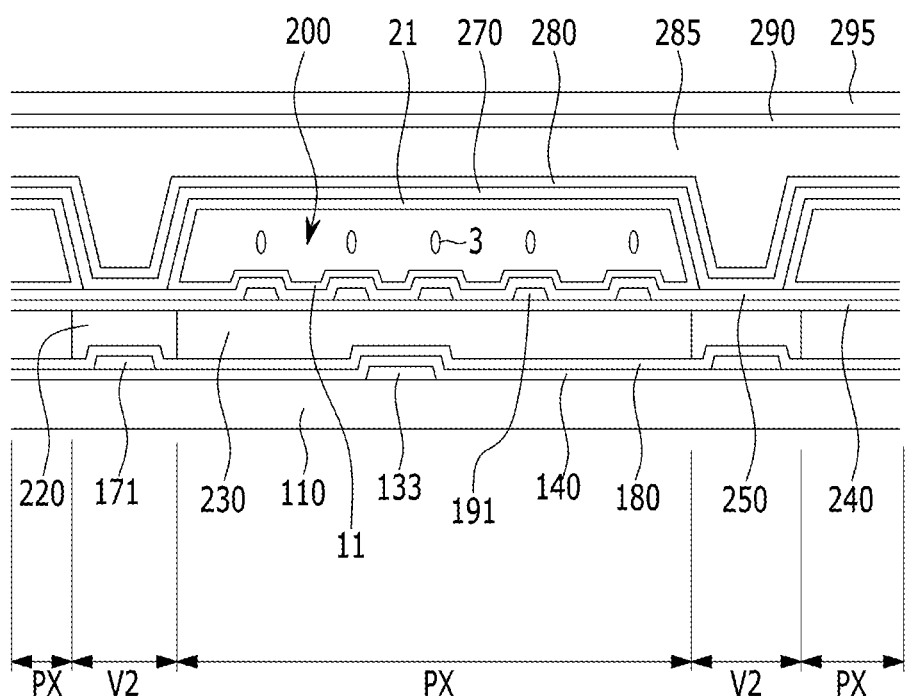

As illustrated in FIGS. 41 and 42, an overcoat layer 295 is provided on the upper insulating layer 290 by depositing a material, which does not react with the liquid crystal 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a substrate including a plurality of pixel areas;
a thin film transistor disposed on the substrate;
a pixel electrode connected to the thin film transistor and disposed in a corresponding pixel area of the pixel areas;
a barrier layer disposed on the pixel electrode;
a roof layer disposed on the barrier layer and spaced apart from the barrier layer, wherein a microcavity is defined between the roof layer and the barrier layer; and
a liquid crystal disposed in the microcavity.

2. The display device of claim 1, wherein
the barrier layer comprises silicon oxide.

3. The display device of claim 2, wherein
the barrier layer functions as a lower alignment layer.

4. The display device of claim 3, further comprising:
an upper alignment layer disposed between the roof layer and the barrier layer,
wherein the microcavity is defined between the upper alignment layer and the barrier layer, and
wherein the upper alignment layer comprises silicon oxide.

5. The display device of claim 4, further comprising:
a lower insulating layer disposed between the upper alignment layer and the roof layer; and
an upper insulating layer disposed on the roof layer,
wherein each of the lower insulating layer and the upper insulating layer comprises silicon oxide.

6. The display device of claim 4, further comprising:
a lower insulating layer disposed between the upper alignment layer and the roof layer; and
an upper insulating layer disposed on the roof layer,
wherein the lower insulating layer comprises silicon oxide, and
wherein the upper insulating layer comprises silicon nitride.

7. The display device of claim 2, wherein
the barrier layer is disposed only in the pixel areas on the substrate, or disposed on substantially an entire of a surface of the substrate including the pixel areas.

8. The display device of claim 2, further comprising:
a lower alignment layer disposed on the barrier layer; and
an upper alignment layer disposed below the roof layer and spaced apart from the lower alignment layer,
wherein the microcavity is defined between the upper alignment layer and the lower alignment layer.

9. The display device of claim 8, wherein
each of the lower alignment layer and the upper alignment layer comprises an organic material.

10. The display device of claim 9, further comprising:
a lower insulating layer disposed between the upper alignment layer and the roof layer; and
an upper insulating layer disposed on the roof layer,
wherein each of the lower insulating layer and the upper insulating layer comprises silicon oxide.

11. A manufacturing method of a display device, comprising:
providing a thin film transistor on a substrate including a pixel area;
providing a pixel electrode connected to the thin film transistor in the pixel area;
providing a barrier layer on the pixel electrode;
providing a sacrificial layer on the barrier layer;
providing a roof layer on the sacrificial layer;
forming an opening in the roof layer, wherein the opening exposes a portion of the sacrificial layer;
providing a microcavity between the pixel electrode and the roof layer by removing the sacrificial layer;
injecting a liquid crystal through the opening; and
providing an overcoat layer on the roof layer, wherein the overcoat layer seals the microcavity.

12. The manufacturing method of a display device of claim 11, wherein
the providing the barrier layer comprises depositing silicon oxide on the substrate, on which the thin film transistor and the pixel electrode are provided.

13. The manufacturing method of a display device of claim 12, wherein
the barrier layer functions as a lower alignment layer.

14. The manufacturing method of a display device of claim 13, further comprising:
providing an upper alignment layer on the sacrificial layer by depositing silicon oxide after the providing the sacrificial layer.

15. The manufacturing method of a display device of claim 14, further comprising:
providing a lower insulating layer on the upper alignment layer by depositing silicon oxide after the providing the upper alignment layer, and
providing an upper insulating layer on the roof layer by depositing silicon oxide after the providing the roof layer.

16. The manufacturing method of a display device of claim 14, further comprising:
providing a lower insulating layer on the upper alignment layer by depositing silicon oxide after the providing the upper alignment layer, and
providing an upper insulating layer on the roof layer by depositing silicon nitride after the providing the roof layer.

17. The manufacturing method of a display device of claim 12, wherein
the depositing the silicon oxide comprises:
depositing the silicon oxide on substantially an entire of a surface of the substrate; or
depositing the silicon oxide on substantially the entire of the surface of the substrate, and patterning the deposited silicon oxide such that the barrier layer is provided only in the pixel area.

18. The manufacturing method of a display device of claim 12, further comprising:
    providing a lower alignment layer on the barrier layer by injecting an aligning agent in the microcavity, and providing an upper alignment layer below the roof layer, after the providing the microcavity,
    wherein the upper alignment layer is spaced apart from the lower alignment layer, and
    the microcavity is defined between the upper alignment layer and the lower alignment layer.

19. The manufacturing method of a display device of claim 18, wherein
    the aligning agent comprises an organic material.

20. The manufacturing method of a display device of claim 19, further comprising:
    providing a lower insulating layer on the sacrificial layer by depositing silicon oxide after the providing the sacrificial layer, and
    providing an upper insulating layer on the roof layer by depositing silicon oxide after the providing the roof layer.

\* \* \* \* \*